(12) United States Patent
Eherenfeldt et al.

(10) Patent No.: US 12,128,587 B2
(45) Date of Patent: *Oct. 29, 2024

(54) SIMULATED SURGICAL SYSTEM, SIMULATED VESSEL, AND METHODS OF MAKING THE SAME AND RELATED COMPONENTS

(71) Applicant: ReSuture, Inc., Surprise, AZ (US)

(72) Inventors: Hannah A. Eherenfeldt, Glendale, AZ (US); Benjamin M. Knapp, Glendale, AZ (US)

(73) Assignee: ReSuture, Inc., Surprise, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/534,788

(22) Filed: Dec. 11, 2023

(65) Prior Publication Data
US 2024/0100750 A1    Mar. 28, 2024

Related U.S. Application Data

(63) Continuation of application No. 17/086,446, filed on Nov. 1, 2020, now Pat. No. 11,904,508.
(Continued)

(51) Int. Cl.
*B29C 41/42* (2006.01)
*B29C 33/38* (2006.01)
(Continued)

(52) U.S. Cl.
CPC .......... *B29C 41/42* (2013.01); *B29C 33/3842* (2013.01); *B29C 33/52* (2013.01); *B29C 41/08* (2013.01); *B29C 41/22* (2013.01); *B29C 41/38* (2013.01); *B33Y 80/00* (2014.12); *B29K 2075/00* (2013.01); *B29K 2083/00* (2013.01);
(Continued)

(58) Field of Classification Search
CPC ...... G09B 23/303; G09B 23/30; B29C 33/52; B29C 41/08
See application file for complete search history.

(56) References Cited

U.S. PATENT DOCUMENTS 10,350,833 B1 *  7/2019  Zaneveld ............. B29C 64/386
11,904,508 B2 *  2/2024  Eherenfeldt ........ B29C 33/3835
(Continued)

FOREIGN PATENT DOCUMENTS

JP        H0830192 A  *  2/1996

OTHER PUBLICATIONS

Translation of JP-H0830192-A (Year: 1996).*

*Primary Examiner* — John J DeRusso
(74) *Attorney, Agent, or Firm* — Birch Tree IP Law & Strategy PLLC; Jamie T. Gallagher

(57) ABSTRACT

Simulated anatomical components, such as simulated vascular vessels, produced by a method that includes forming an anatomical component mold from a soluble polymer such that the mold defines an interior void of the simulated anatomical component. One or more layers of an elastomeric material is applied around the anatomical component mold and the material is allowed to cure to form a wall of the simulated anatomical component. At least a portion of the mold is dissolved to form a passage for liquid within the simulated anatomical component. Simulated anatomical components are connectable to other components of a surgical simulation system and can be modularized.

19 Claims, 31 Drawing Sheets

Related U.S. Application Data

(60) Provisional application No. 62/962,992, filed on Jan. 18, 2020, provisional application No. 62/963,023, filed on Jan. 18, 2020, provisional application No. 62/929,418, filed on Nov. 1, 2019.

(51) Int. Cl.

| | |
|---|---|
| *B29C 33/52* | (2006.01) |
| *B29C 41/08* | (2006.01) |
| *B29C 41/22* | (2006.01) |
| *B29C 41/38* | (2006.01) |
| *B29K 75/00* | (2006.01) |
| *B29K 83/00* | (2006.01) |
| *B29L 31/00* | (2006.01) |
| *B33Y 80/00* | (2015.01) |
| *G09B 23/30* | (2006.01) |

(52) U.S. Cl.
CPC ...... *B29K 2825/06* (2013.01); *B29K 2829/04* (2013.01); *B29K 2855/02* (2013.01); *B29K 2995/0046* (2013.01); *B29K 2995/0059* (2013.01); *B29L 2031/7532* (2013.01); *G09B 23/303* (2013.01)

(56) References Cited

U.S. PATENT DOCUMENTS

| | | | | |
|---|---|---|---|---|
| 2005/0186361 | A1* | 8/2005 | Fukuda | G09B 23/30 264/497 |
| 2008/0076101 | A1* | 3/2008 | Hyde | G09B 23/30 156/61 |
| 2015/0282963 | A1* | 10/2015 | Gounis | A61B 5/055 623/1.21 |
| 2021/0094206 | A1* | 4/2021 | Chen | B29C 33/52 |

* cited by examiner

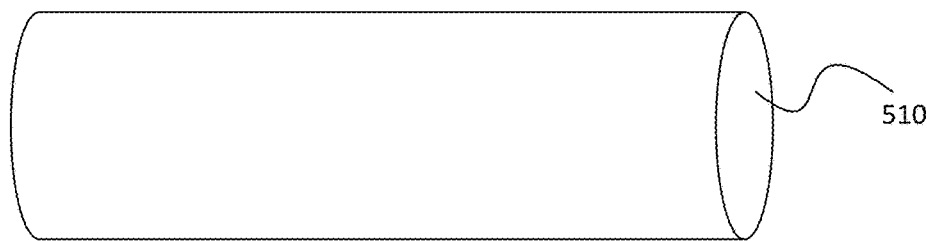
FIG. 5
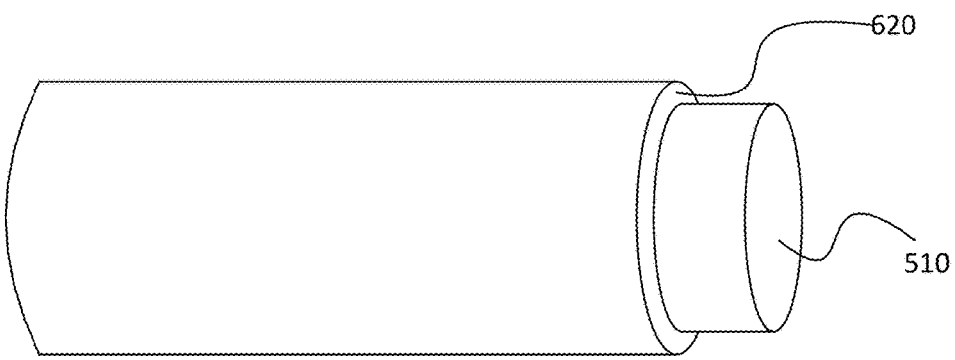
FIG. 6
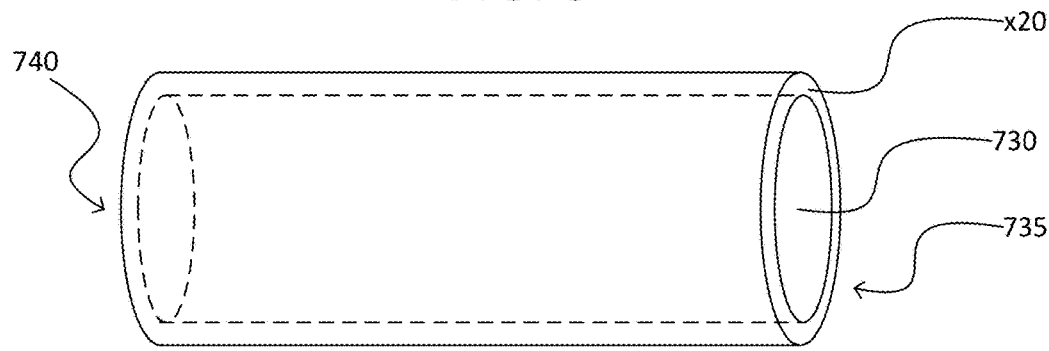
FIG. 7
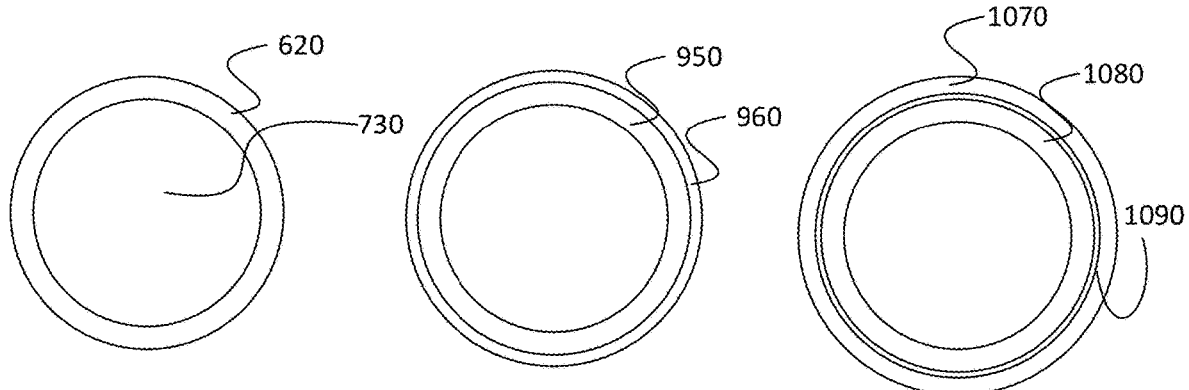
FIG. 8
FIG. 9
FIG. 10

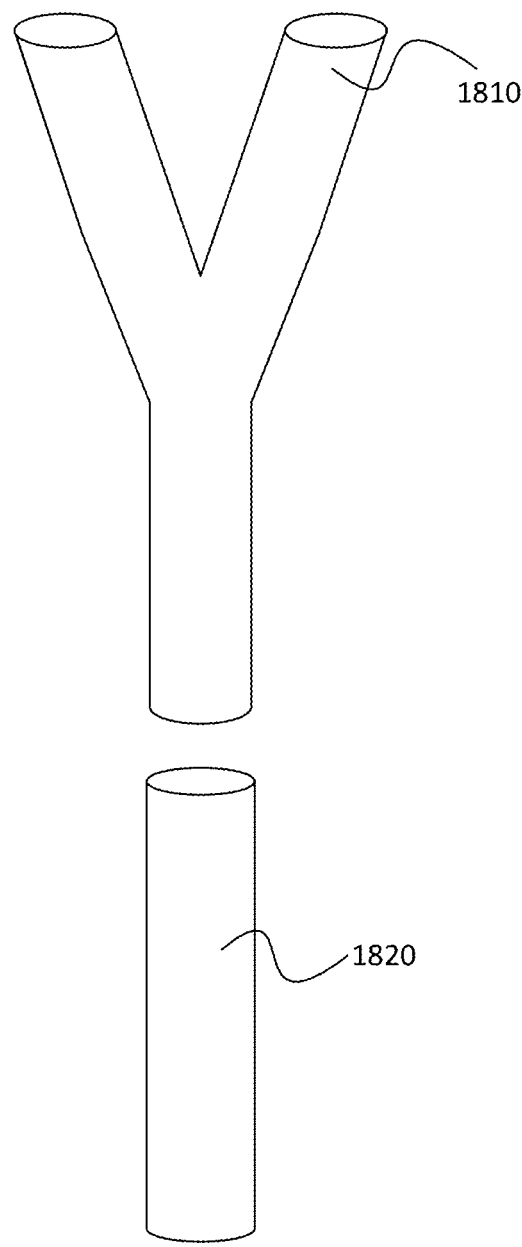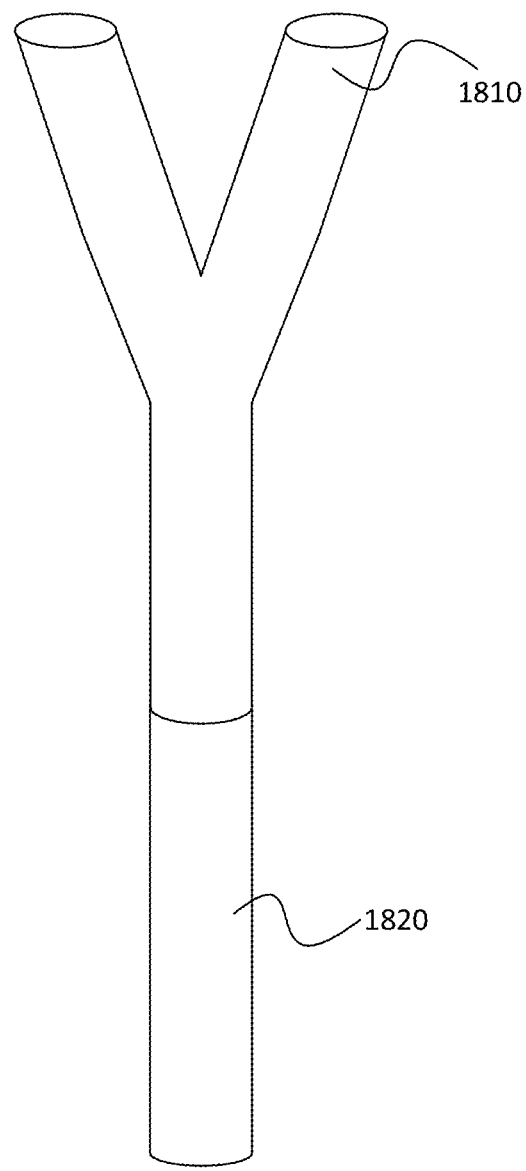
FIG. 18A
FIG. 18B

SIMULATED SURGICAL SYSTEM, SIMULATED VESSEL, AND METHODS OF MAKING THE SAME AND RELATED COMPONENTS

RELATED APPLICATION DATA

This application is a continuation of U.S. patent application Ser. No. 17/086,446, filed Nov. 1, 2020, entitled "A Simulated Surgical System, Simulated Vessel, and Methods of Making the Same and Related Components," which is incorporated by reference herein in its entirety.

This application claims the benefit of priority of U.S. Provisional Patent Application Ser. No. 62/929,418, filed Nov. 1, 2019, entitled "A Simulated Surgical System, Simulated Vessel, and Methods of Making the Same and Related Components;" U.S. Provisional Patent Application No. 62/962,992, filed Jan. 18, 2020, entitled "A Simulated Surgical System, Simulated Vessel, and Methods of Making the Same and Related Components;" and U.S. Provisional Patent Application No. 62/963,023, filed Jan. 18, 2020, entitled "A Simulated Surgical System, Simulated Vessel, and Methods of Making the Same and Related Components;" each of which is incorporated by reference herein in its entirety.

FIELD OF THE INVENTION

The present invention generally relates to the field of surgical simulation and surgical simulation devices. In particular, the present invention is directed to a simulated surgical system, simulated vessel, and methods of making the same and related components.

BACKGROUND

Having long been based on a traditional model, surgical residency education and training programs have sought new ways to respond to modern challenges. With the introduction of robotics and laparoscopic surgery, surgeons must frequently learn new and complex technologies. Additionally, an increased focus on patient safety has limited the variety and duration of training available to surgical residents.

For nearly two decades, various stakeholders have been calling for major revisions to the current training model. The response to this has been the rapid growth surgical simulation facilities that can provide a consequence-free environment for trainees to become familiar with surgical instruments and improve dexterity. Surgical simulations can include the use of computers and/or inanimate training methods such as cadavers, animal models, or synthetic models that attempt to replicate human physiology. However, animal and cadaver models can be difficult to obtain and do not replicate the full surgical experience. The physical properties of cadaver tissue are altered by preservation techniques and there is no guarantee that conditions requiring surgery (for example, plaque in an artery) will be present in the specimen. In addition to lacking common human abnormalities, animal models have greatly differing anatomy, resulting in training experiences that are not sufficiently representative of surgical procedures. Furthermore, computer and virtual reality models are still lacking haptic feedback technology that would sufficiently simulate the feel of a surgery.

Although a variety of synthetic benchtop training models have been developed, they often lack the detail and functionality to effectively replicate the conditions of a live surgical operation. These models are not without merit but are generally designed to train users in gross anatomy rather than specific surgical technique. Known training devices may not replicate features that are critical in a surgical procedure.

SUMMARY OF THE DISCLOSURE

In one implementation, the present disclosure is directed to a method of producing a simulated vascular vessel. The method includes forming a vascular mold from a soluble polymer, the vascular vessel mold defining an interior void of a vascular vessel for a surgical simulation system; applying one or more layers of elastomer around the vascular vessel mold to form a simulated vascular vessel; allowing the one or more layers of elastomer to cure to form a wall of the simulated vascular vessel; applying one or more layers of an oil-based material to a surface of at least one of the layers of the one or more layers of elastomer; and at least partially dissolving the vascular vessel mold to create a passage for liquid in the simulated vascular vessel.

In another implementation, the present disclosure is directed to a method of producing a simulated vascular vessel. The method includes forming a vascular mold from a soluble polymer, the vascular vessel mold defining an interior void of a vascular vessel for a surgical simulation system; applying one or more layers of elastomer around the vascular vessel mold to form a simulated vascular vessel; allowing the one or more layers of elastomer to cure to form a wall of the simulated vascular vessel; applying one or more layers of an oil-based material to a surface of at least one of the layers of the one or more layers of elastomer; and at least partially dissolving the vascular vessel mold to create a passage for liquid in the simulated vascular vessel wherein at least a portion of the soluble polymer remains in the passage as a simulated vascular abnormality.

In yet another implementation, the present disclosure is directed to a method of producing a simulated vascular vessel. The method includes forming a vascular mold from a soluble polymer, the vascular vessel mold defining an interior void of a vascular vessel for a surgical simulation system; applying at least two layers of elastomer around the vascular vessel mold to form a simulated vascular vessel; applying a layer of an elastic mesh fabric between a first one and a second one of the at least two layers of elastomer; allowing the at least two layers of elastomer to cure to form a wall of the simulated vascular vessel; applying one or more layers of an oil-based material to a surface of at least one of the layers of the one or more layers of elastomer; and at least partially dissolving the vascular vessel mold to create a passage for liquid in the simulated vascular vessel wherein at least a portion of the soluble polymer remains in the passage as a simulated vascular abnormality.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 5 illustrates an exemplary implantation of an anatomical mold;

FIG. 6 illustrates another exemplary implementation of an anatomical mold having one or more layers of a material applied to a portion of the mold;

FIG. 7 illustrates another view of the one or more layers of material of FIG. 6 with at least a portion of the exemplary anatomical mold removed;

FIG. 8 illustrates an exemplary cross-sectional view of a simulated vessel of FIG. 7;

FIG. 9 illustrates an exemplary cross-sectional view of a simulated vessel;

FIG. 10 illustrates an exemplary cross-sectional view of another simulated vessel;

FIG. 18A illustrates an exemplary view of an exemplary implementation of an anatomical mold and a rod;

FIG. 18B illustrates another view of the exemplary anatomical mold and rod of FIG. 18A;

DETAILED DESCRIPTION

Figure 1:
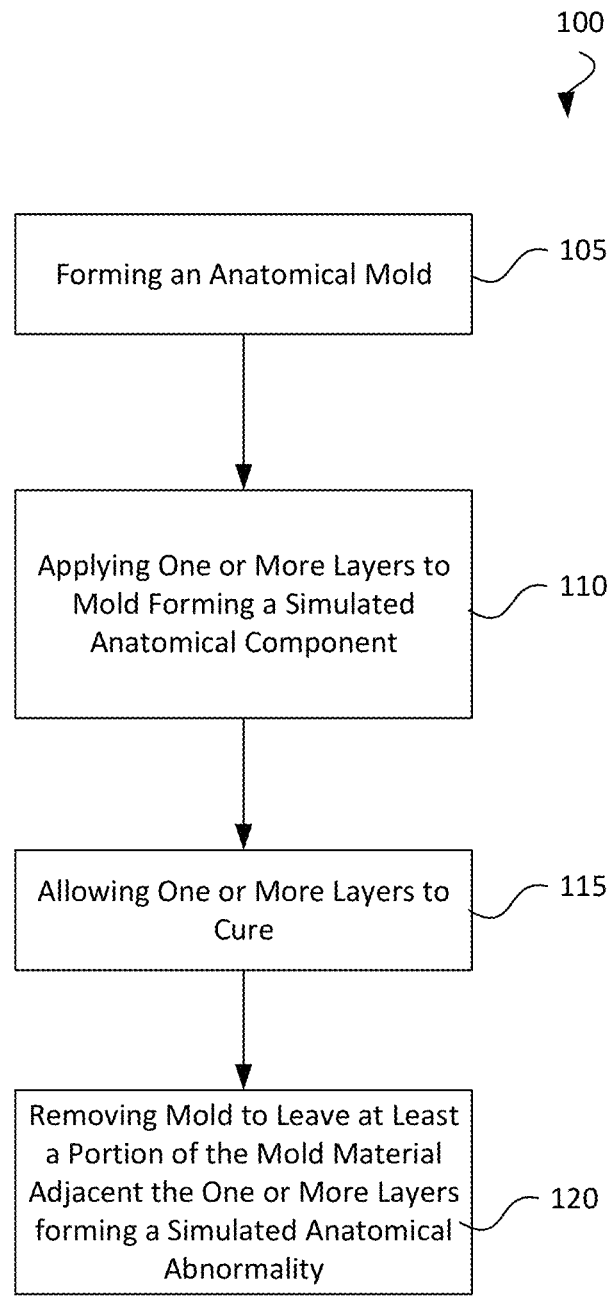
FIG. 1 illustrates one exemplary implementation of a method of producing a surgical simulation system.

FIG. 1 illustrates one exemplary embodiment of a method 100 of producing a surgical simulation system. At step 105, an anatomical mold is formed. An anatomical mold is a mold that can be utilized to form a simulated anatomical component. A simulated anatomical component can be used in a surgical simulator (e.g., for allowing users to practice surgical skills on, in, and/or near the anatomical component). Example anatomical components include, but are not limited to, a vascular vessel, a mucous membrane, a tissue of an organ, an anatomical duct (e.g., a bile duct), a skin tissue, a fascia, ocular tissues, any sub-portion thereof, and any combinations thereof. In one example, an anatomical component is a vascular vessel. Examples of a vascular vessel include, but are not limited to, an artery, a vein, a capillary, a heart chamber, an arteriole, a venule, and any combinations thereof. A vascular vessel may include one or more bifurcations.

An anatomical mold may be made of any material capable of providing a template for an anatomical component (e.g., by layering another material on at least a portion of the anatomical mold) and being at least partially removed to form the simulated anatomical component. In one example, an anatomical mold may include a soluble polymer material. Examples of a soluble polymer material include, but are not limited to, a water-soluble polymer, a synthetic soluble polymer, an aliphatic rubbery synthetic polymer, a polyvinyl alcohol, a polystyrene polymer (e.g., a high-impact polystyrene polymer), alkali-soluble thermoplastic material, an acrylonitrile butadiene styrene, and any combinations thereof. Example solvents for a soluble polymer include, but are not limited to, water, an alcohol, acetone, a terpene (e.g., d-limonene), and any combinations thereof. In one example, a soluble polymer is a polyvinyl alcohol. In one such example, a soluble polyvinyl alcohol is dissolvable in water. In another example, a soluble polymer is a synthetic polymer. In yet another example, a soluble polymer is an aliphatic rubbery synthetic polymer. In still another example, a soluble polymer is water-soluble. In still yet another example, a soluble polymer is an acrylonitrile butadiene styrene polymer. In one such example, an acrylonitrile butadiene styrene polymer is dissolvable in acetone. In a further example, a soluble polymer is a high impact polystyrene polymer. In one such example, a high impact polystyrene polymer is dissolvable in a terpene. Combinations of the above examples are contemplated where applicable. Various physical and chemical characteristics may be considered in choosing a material for an anatomical mold. Examples of such characteristics include, but are not limited to, a melting point, a solubility in a solvent (e.g., water, alcohol, acetone), one or more characteristics indicative of an ability to simulate an anatomical abnormality, and any combinations thereof. In one example, an ability to simulate an anatomical abnormality is considered as at least one of the characteristics in choosing a material to include in an anatomical mold. An anatomical abnormality is an abnormal or diseased structure with abnormal morphology (color, size, form, consistency), mereology (absence, presence), or topology (disconnected, obstructed). Examples of an anatomical abnormality include, but are not limited to, a plaque, a stenosis, a thrombosis, an embolism, a tumor, a cataract, a calcification, and any combinations thereof. In one example, an anatomical abnormality simulation includes a plaque. Examples of a plaque to be simulated include, but are not limited to, a vascular plaque (e.g., an atherosclerotic plaque), a plaque embedded in a mucous membrane, a fatty plaque, a calcified plaque, and any combinations thereof.

Examples of a surgical simulation that can be simulated using a simulated anatomical component include, but are not limited to, a vascular procedure, simulation of an insertable object (e.g., an intravenous object, a stent, a graft, a catheter, a needle, an endoscope), angioplasty, anastomoses (e.g., arterial or venous anastomosis, bile duct anastomosis, pancreaticojejunal anastomosis), endarterectomies, atherectomies, a bypass surgery, and any combinations thereof.

An anatomical mold may be formed by a variety of known processes. Examples of processes for forming an anatomical mold include, but are not limited to, injection molding, printing (e.g., using a 3-dimensional printing device), rotational molding, and any combinations thereof. In one example, an anatomical mold is formed using a process that includes injection molding. In another example, an anatomical mold is formed using a process that includes printing. A surface of an anatomical mold may be formed to include one or more simulated surface features that are designed to impart in one or more surfaces of a simulated anatomical component formed from the anatomical mold with the simulated surface features (e.g., on an interior wall of one or more layers of a material used to form a simulated anatomical component). Examples of a simulated surface feature include, but are not limited to, a texture of a surface of an anatomical component, the shape of an anatomical component, and any combinations thereof. A simulated surface feature may be included in an anatomical mold via any of a variety of known processes. Example processes for creating a simulated surface feature as part of an anatomical mold include, but are not limited to, injection molding, layering a feature on a surface of an anatomical mold, removing a portion of the anatomical mold to create a negative space in the surface of the anatomical mold, printing (e.g., via a three-dimensional printing device), and any combinations thereof.

At step 110, one or more layers of materials are applied to at least a portion of the anatomical mold to form a simulated anatomical component. Example materials for including in one or more layers to apply to at least a portion of an anatomical mold include, but are not limited to, an elastomer material, an elastic mesh fabric, a hydrophilic material (e.g., a hydrogel, a plasma-treated elastomer, a silane, polyethylene glycol), an oil-based material (e.g., a silicone oil, a petroleum jelly), and any combinations thereof. Examples of an elastomer material include, but are not limited to, a silicone, a polyurethane rubber, and any combinations thereof. Examples materials included in an elastic mesh fabric include, but are not limited to, a polyester, a polyether polyurea composition, and any combinations thereof. In one example, one or more layers of a material including an elastomer (e.g., a silicone material) are applied to at least a portion of an anatomical mold. In another example, one or more layers of a material including an elastomeric material (e.g., a silicone) are applied to at least a portion of an anatomical mold and one or more layers of an elastic mesh fabric are applied to the one or more silicone layers. In one such example, one or more additional layers of a material including an elastomeric material (e.g., a silicone) are applied to the one or more layers of an elastic mesh fabric. One or more layers of an oil-based material may be applied to a surface of at least one of the layers of the one or more layers of elastomer. One or more layers of a hydrophilic material may be applied to a surface of at least one of the layers of the one or more layers of elastomer.

At step 115, the one or more layers of material are allowed to form (e.g. via curing) a simulated anatomical component (e.g., a simulated anatomical tissue material). In one example, the simulated anatomical component includes a wall of a vascular vessel.

At step 120, the anatomical mold is removed from the one or more layers. In one exemplary embodiment, at least a portion of the anatomical mold is removed from the one or more layers of material leaving at least a portion of the material of the mold adjacent the one or more layers of material to form a simulated anatomical abnormality. It is contemplated that depending on the particular simulated anatomical component created, that being "adjacent" the one or more layers of material may or may not require physical contact with the material of the one or more layers. Being adjacent may include positions such as a remaining material touching a surface of the one or more layers, a remaining material being positioned within a void created by the one or more layers, and any combinations thereof. In one example, at least a portion of the material of the mold remains touching a surface of the one or more layers. In another example, at least a portion of the material of the mold remains positioned within a void created by the one or more layers.

Removal of the anatomical mold can be achieved by a variety of processes (e.g., in addition to the anatomical mold). Examples of processes for removing an anatomical mold material include, but are not limited to, dissolving a material, melting a material (e.g., an oil-based material such as a wax), application of heat, physically pulling out part of a mold material, dislodging a mold material, and any combinations thereof. In one exemplary implementation, the one or more layers of material applied to an anatomical mold form one or more walls of a simulated anatomical vessel and at least a portion of the material of the anatomical mold is removed to form a void of the vessel. In one such example, a portion of the material of the anatomical mold remains adjacent the one or more layers of material to form a simulation of an anatomical abnormality (e.g., a plaque).

Figure 2:
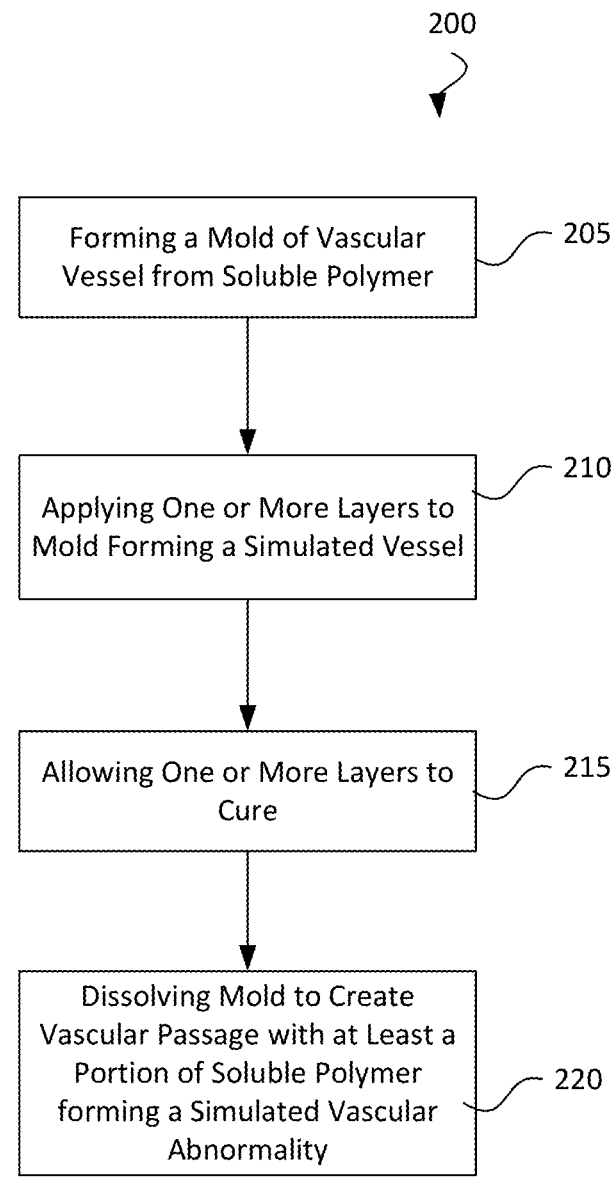
FIG. 2 illustrates another exemplary implementation of a method of producing a surgical simulation system.

FIG. 2 illustrates another exemplary implementation of a method 200 of producing a surgical simulation system. At step 205, a mold of a vascular vessel is formed of a soluble polymer. At step 210, one or more layers of a material are applied to the anatomical mold forming one or more walls of a simulated vessel. At step 215, any of the one or more layers of material that require a time period and/or treatment to form are allowed to cure (or otherwise form to a solid or semi-solid form). At step 220, at least a portion of the material of the mold of a vascular vessel is removed leaving at least a portion of the material adjacent the one or more layers to form a simulated vascular abnormality (e.g., a plaque).

Figure 3:
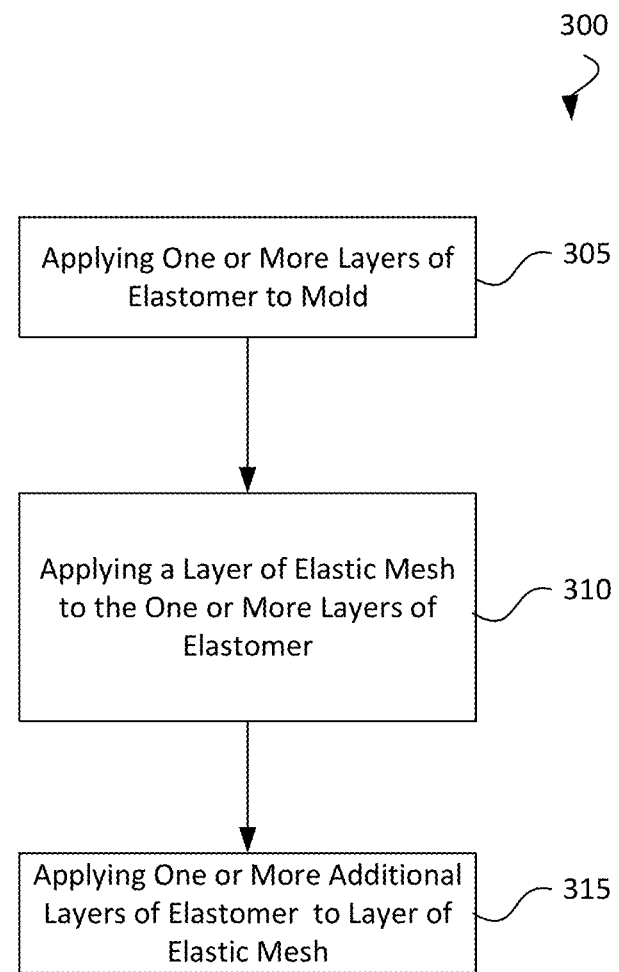
FIG. 3 illustrates one exemplary implementation of a method of applying one or more layers of an elastomer to an anatomical mold.

FIG. 3 illustrates one exemplary implementation of method steps 300 of applying one or more layers of an elastomer (e.g., silicone) to an anatomical mold (e.g., as part of a method such as method 100, method 200). At step 305, one or more layers of an elastomer are applied to an anatomical mold. At step 310, one or more layers of an elastic mesh material are applied to the one or more layers of elastomer. At step 315, one or more additional layers of an elastomer are applied to the one or more layers of elastic mesh material.

Figure 4:
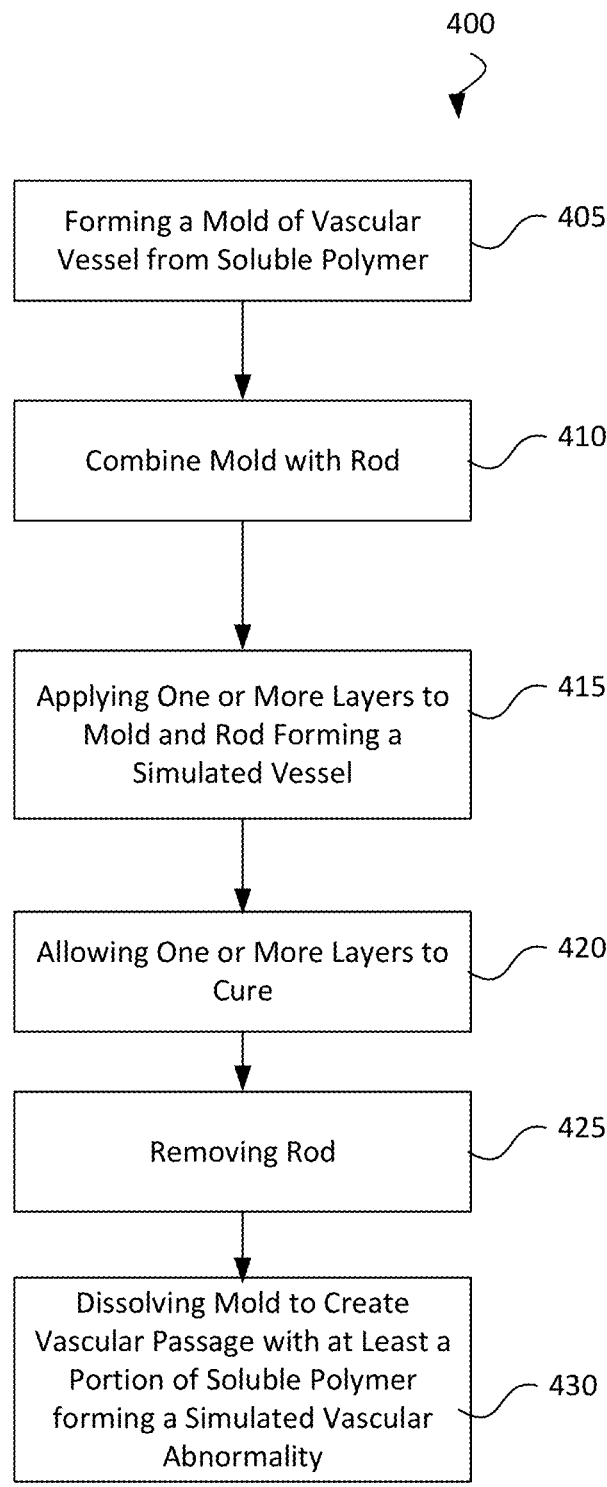
FIG. 4 illustrates yet another exemplary implementation of a method of producing a surgical simulation system.
Figure 11:
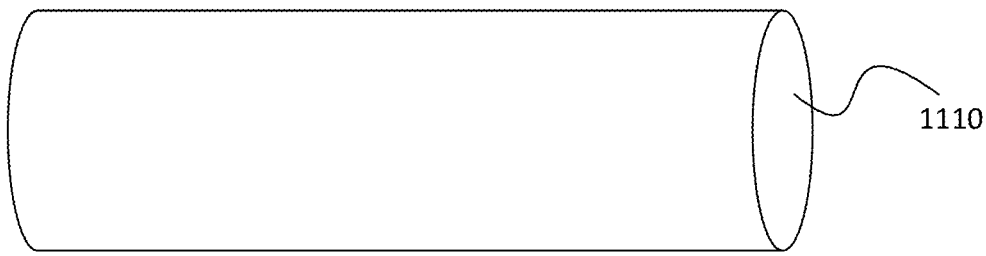
FIG. 11 illustrates yet another exemplary implementation of an anatomical mold.
Figure 12:
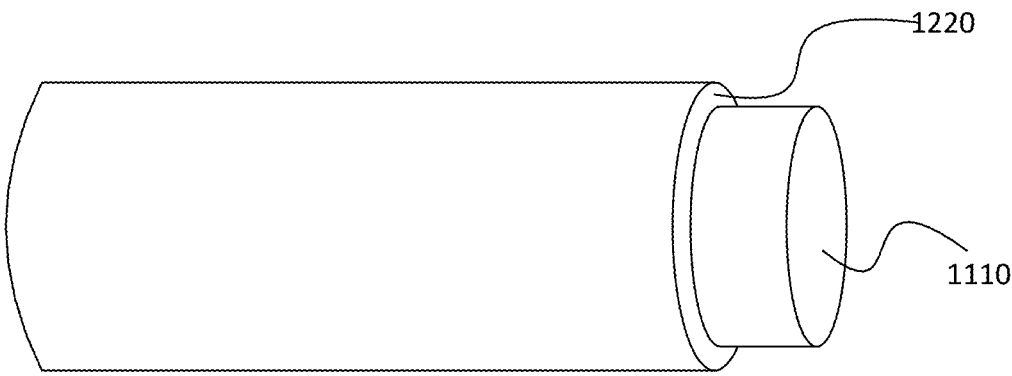
FIG. 12 illustrates another exemplary implementation of an anatomical mold having one or more layers of a material applied to a portion of the mold.

Other materials other than an anatomical mold may be utilized in creating a simulated anatomical component. Examples of such materials include a rod in the shape of a portion of an anatomical component. In one such example, a rod may be connected to a portion of an anatomical mold to extend the mold, such as to provide a longer portion of a simulated anatomical vessel. FIG. 4 illustrates one exemplary implementation of a method 400 of producing a surgical simulation system involving an additional material. At step 405, a mold of a vascular vessel is formed using a soluble polymer. A material other than a soluble polymer may be used in place of or in combination with a soluble polymer in other example implementations. At step 410 a rod is combined with the mold of a vascular vessel. Example ways to combine a rod to a mold include, but are not limited to, use of a adhesive material to connect an end of the rod to a surface of the mold, inserting, and any combinations thereof. Example materials for a rod include, but are not limited to, a plastic, a metal, a polymer, wood, glass, and any combinations thereof. At step 415 one or more layers of material are applied to at least a portion of the mold and rod to form a simulated vessel. In one example, the one or more layers includes at least one layer of an elastomer (e.g., silicone). In one such example, the one or more layers also includes one or more layers of an elastic mesh material. At step 420, any of the one or more layers that require a curing and/or resting step are allowed a time period and/or are treated to cause the one or more layers to form the desired consistency for the simulated vessel. At step 425, the rod is removed from the one or more layers to form a void where the rod was located. At step 430, at least a portion of the material of the mold is dissolved to create a vascular passage with at least a portion of the material of the mold remaining adjacent to the one or more layers forming a simulated vascular abnormality.

FIG. 5 illustrates an exemplary implementation of an anatomical mold 510 in the general shape of a cylinder. Other regular and irregular shaped molds are contemplated and depend on the shape and configuration of the desired simulated anatomical component to be formed from the anatomical mold.

FIG. 6 illustrates another exemplary implementation of anatomical mold 510 in which anatomical mold 510 has one or more layers of a material 620 applied to a portion of mold 510. In this example, the one or more layers of a material 620 encircle the cylindrical mold 510 to form walls of a simulated vessel.

FIG. 7 illustrates the one or more layers of material 620 with the anatomical mold 510 removed to create a void 730 that forms a passageway between end 735 and end 740. The dotted lines in the figure are intended to represent inner surfaces of the one or more layers 620.

FIG. 8 illustrates an exemplary cross-sectional view of the simulated vessel of FIG. 7 showing the one or more layers of material 620 in the form of walls of the simulated vessel. FIG. 9 illustrates another exemplary cross-sectional view of a simulated vessel, such as the simulated vessel of FIG. 7 in which the one or more layers are shown as two distinct layers 950 and 960. Layer 950 is shown as having a different thickness as layer 960. Different layers of one or more layers applied to a mold to form an anatomical component may be of any thickness each. In one example, layers may be the same as other layers, different from other layers, or a combination of thicknesses.

FIG. 10 illustrates an exemplary cross-sectional view of another example simulated vessel, such as the simulated vessel of FIG. 7, in which a first set of one or more layers 1070 is located on an outer portion of the wall. In one example, one or more layers 1070 includes an elastomer (e.g., silicone). FIG. 10 also shows a second set of one or more layers 1080 is located on the inner portion of the wall. In one example, one or more layers 1080 includes an elastomer (e.g., silicone). FIG. 10 also illustrates a third set of one or more layers 1090 sandwiched between one or more layers 1070 and one or more layers 1080. In one example, one or more layers 1090 includes an elastic mesh material.

Figure 13:
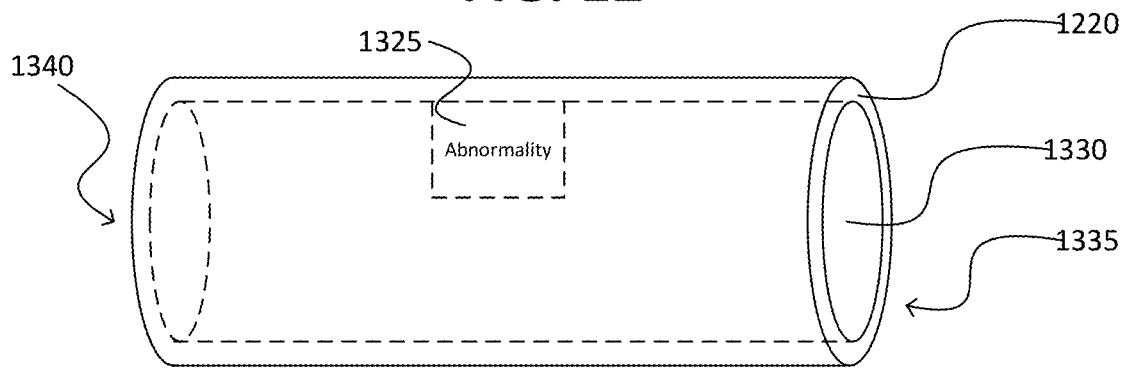
FIG. 13 illustrates another view of the one or more layers of material of FIG. 12 with at least a portion of the exemplary anatomical mold removed.
Figure 14:
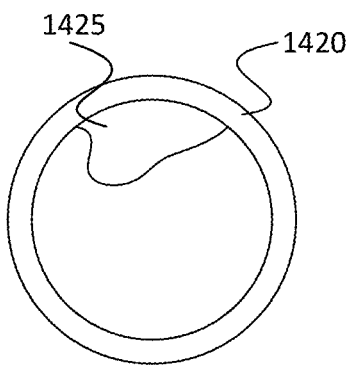
FIG. 14 illustrates a cross-sectional view of a simulated vessel of FIG. 13.

FIGS. 11 to 14 illustrate another example of a simulated vessel formed by the application of one or more layers of a material to an anatomical mold. In this example, an anatomical mold 1110 has applied thereto one or more layers of a material 1220 (e.g., silicone) to a portion of the anatomical mold 1110. In this example, one or more layers of material 1220 form the walls of a simulated vessel. FIG. 13, shows the one or more layers of material 1220 with a portion of the material of the anatomical mold 1110 removed leaving a portion of the material forming an anatomical anomaly 1325 adjacent the one or more layers 1220. The dotted lines represent inner surfaces of the simulated vessel and the anatomical anomaly 1325 inside the one or more layers 1220. The void 1330 formed by the removal of the portion of the mold 1110 forms a passageway between end 1335 and end 1340. FIG. 14 illustrates a cross-sectional view of an example of a simulated vessel, such as the simulated vessel of FIG. 13, showing one or more layers of material 1420 forming the walls of the simulated vessel. An anatomical anomaly 1425 is shown having an irregular shape within the simulated vessel adjacent the inside surface of the one or more layers 1420. Anatomical anomaly 1425 was formed from a portion of an anatomical mold (e.g., anatomical mold 1110 of FIGS. 11 and 12) that was partially removed (e.g., via dissolving).

Figure 15:
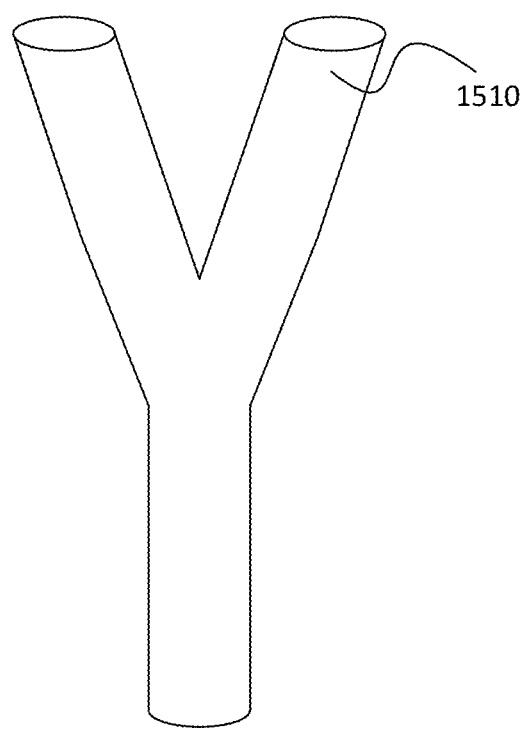
FIG. 15 illustrates still another exemplary implementation of an anatomical mold in the shape of a joint for a vascular vessel.
Figure 16:
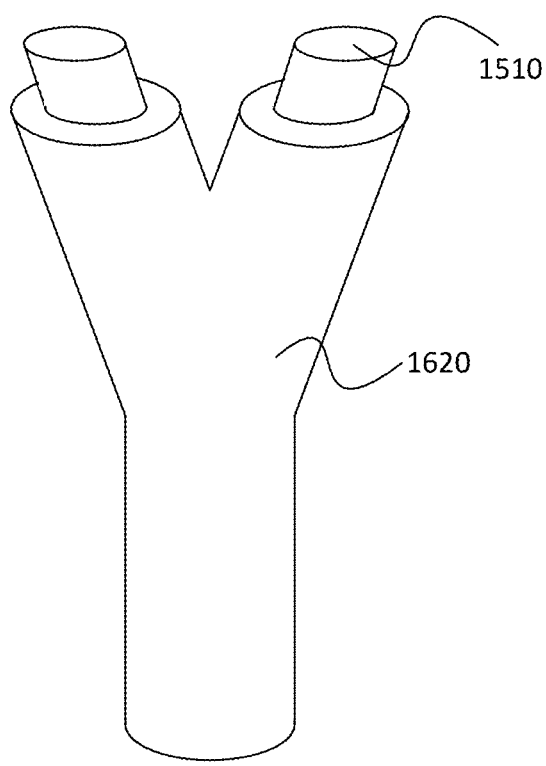
FIG. 16 illustrates an exemplary implementation of the anatomical mold of FIG. 15 with one or more layers of a material applied to a portion of the mold.
Figure 17:
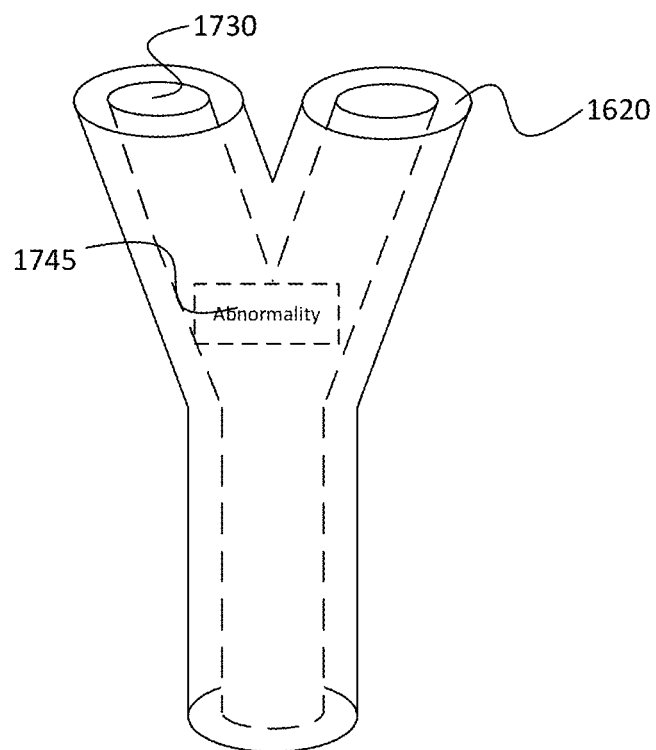
FIG. 17 illustrates an exemplary view of the one or more layers of material of FIG. 16 with at least a portion of the exemplary anatomical mold removed.

FIG. 15 illustrates another exemplary implementation of an anatomical mold 1510 in the shape of a joint for a vascular vessel. FIG. 16 illustrates anatomical mold 1510 having applied thereon one or more layers of material 1620. FIG. 17 illustrates one or more layers 1620 with anatomical mold 15 removed at least in part to generate void 1730. A portion of the material of one or more layers 1620 remains adjacent the inner surface (represented by dotted lines) as a simulated anatomical abnormality 1745. The vascular vessel formed by one or more layers 1620 is in the shape of a vascular bifurcation.

FIG. 18A illustrates yet another exemplary implementation of an anatomical mold 1810 and a rod 1820. In FIG. 18B rod 1820 is connected to an end of anatomical mold 1810. One or more layers of a material may be applied to portions of the combined anatomical mold 1810 and rod 1820 to form a simulation of an anatomical component (e.g., a vascular bifurcation with elongated vascular vessel) as discussed herein.

A simulation of an anatomical component as discussed herein may be combined with one or more other components to form a surgical simulation device. Such devices may be in the form of a kit designed to allow a user to simulate a surgical procedure using the simulated anatomical component. In one exemplary aspect, a kit may be configured to allow a fluid to be circulated through a pathway in the simulated anatomical component (e.g., to simulate blood flow or the flow of another bodily fluid). In another exemplary aspect, a kit may include a simulated external skin cover that allows a user to simulate entry through skin into a body cavity containing the simulated anatomical component according to the current disclosure. Examples of additional components for a surgical simulation device include, but are not limited to, tubing for connecting various ends of a simulated anatomical component to a pumping mechanism, a pumping mechanism, a housing, a simulated skin cover, a fluid reservoir, various simulated tissue types (e.g., adipose tissue, muscular tissue, and nervous tissue), and any combinations thereof. Examples of a pumping mechanism include, but are not limited to, a peristaltic pump, a constant flow pump, a pulsatile flow pump, and any combinations thereof.

Figure 19:
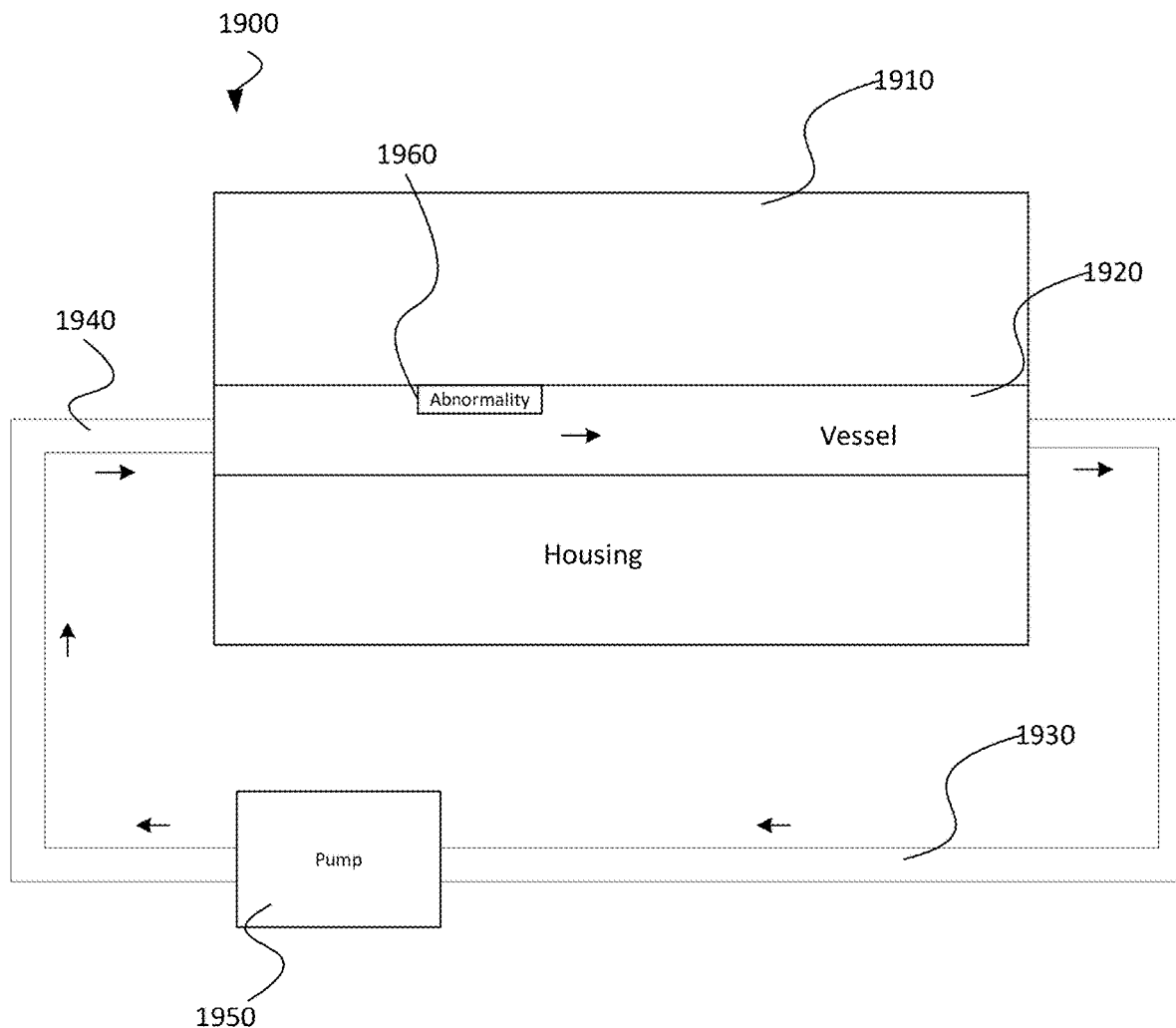
FIG. 19 illustrates an exemplary implementation of a system for surgical simulation.

FIG. 19 illustrates an exemplary implementation of a system for surgical simulation 1900. System 1900 may be in the form of a kit. System 1900 includes a housing 1910. A housing, such as housing 1910, may be in the form of a box or other enclosure simulating an anatomical cavity. A housing, such as housing 1910, may be constructed of any of a variety of known materials. Examples of materials for a housing include, but are not limited to, a plastic, a metal, a polymer, a glass, and any combinations thereof. Housing 1910 includes a simulated vascular vessel 1920 created using a process as disclosed herein. Any variation of a simulated anatomical component according to the current disclosure could be used in place of vessel 1920. In one exemplary implementation, simulated vascular vessel 1920 is removably connected to housing 1920 to allow for replacement with other simulated anatomical components of similar and/or different construction. Vessel 1920 is connected via openings in housing 1910 to tubing 1930 and tubing 1940, each of which connects to a pump 1950. A liquid (e.g., water) can be inserted into the system such that the liquid simulated blood flow (or the flow of a different anatomical fluid) through tubing 1940 into a pathway in vessel 1920 into tubing 1930 and back to pump 1950 to optionally repeat the process. Examples of a liquid for use in simulating an anatomical fluid include, but are not limited to, water, glycerin, simulated body fluid, and any combinations thereof. Vessel 1920 is shown with an anatomical abnormality 1960 formed from a portion of a material of an anatomical mold used to create vessel 1920, the portion having remained adjacent a wall of vessel 1920 upon removal of a portion of the anatomical mold. Housing 1920 may include a cover (not shown) over an opening that allows access to vessel 1920. Such a cover may be configured to simulate skin. Such a cover may be removably attached to a housing, such as housing 1920. In other examples, such a cover may be more permanently attached to a housing, such as housing 1920. A simulated skin cover may be made of a material that simulates the mechanical properties of human skin such that as a user cuts through the simulated skin cover, the experience approximates that of cutting through actual skin. Examples of a material for use in a simulated skin cover include, but are not limited to, an elastomer, a fabric, a hydrogel, a leather, and any combinations thereof. A simulated skin may be made of one or more layers and/or include layers simulating other tissues and organs (e.g., as part of the simulated skin or closely associated or attached thereto). For example, a simulated skin may include associated simulated layers representing tissues and organs such as a muscle, adipose tissue, nerve tissue, other tissues, and any combinations thereof. A simulated skin cover may be attached to a housing, such as housing 1910, in a fashion that allows the simulated skin cover to be removed and replaced. Example mechanisms for removable connection include, but are not limited to, protrusions in a housing that connect via holes in a simulated skin cover, sockets, clips, and any combinations thereof. Example mechanisms for nonremovable connection of a cover include, but are not limited to, an adhesive (e.g., a silicon glue), allowing two or more components to cure together, and any combinations thereof.

A fluid reservoir may also be included in a housing, such as housing 1910, for storage of fluid for use in a simulation system. Such a fluid reservoir may also be external to a housing (e.g., a separate component in line with tubing. Additional tubing can be utilized to connect a fluid reservoir such that fluid therein may be pumped through an anatomical component in the housing.

In one example of a use of system 1900, while a fluid flows through vessel 1920, a user may make an incision in the simulated skin cover to reveal the enclosure of housing 1910. Holding back the simulated skin cover, the user may gain access to vessel 1920 to perform a simulated procedure on vessel 1920, such as removal of all or a portion of anatomical abnormality 1960. During such a simulated procedure, a user may clamp one or more of tubing 1930, tubing 1940, and vessel 1920 to restrict the fluid flow through the system. Upon completion of a procedure, a user may suture any incisions made in vessel 1920 and/or the simulated skin cover. In one exemplary aspect, allowing fluid flow through vessel 1920 (e.g., via removal of clamps) after suturing will allow a user to test the efficacy of sutures.

Figure 20:
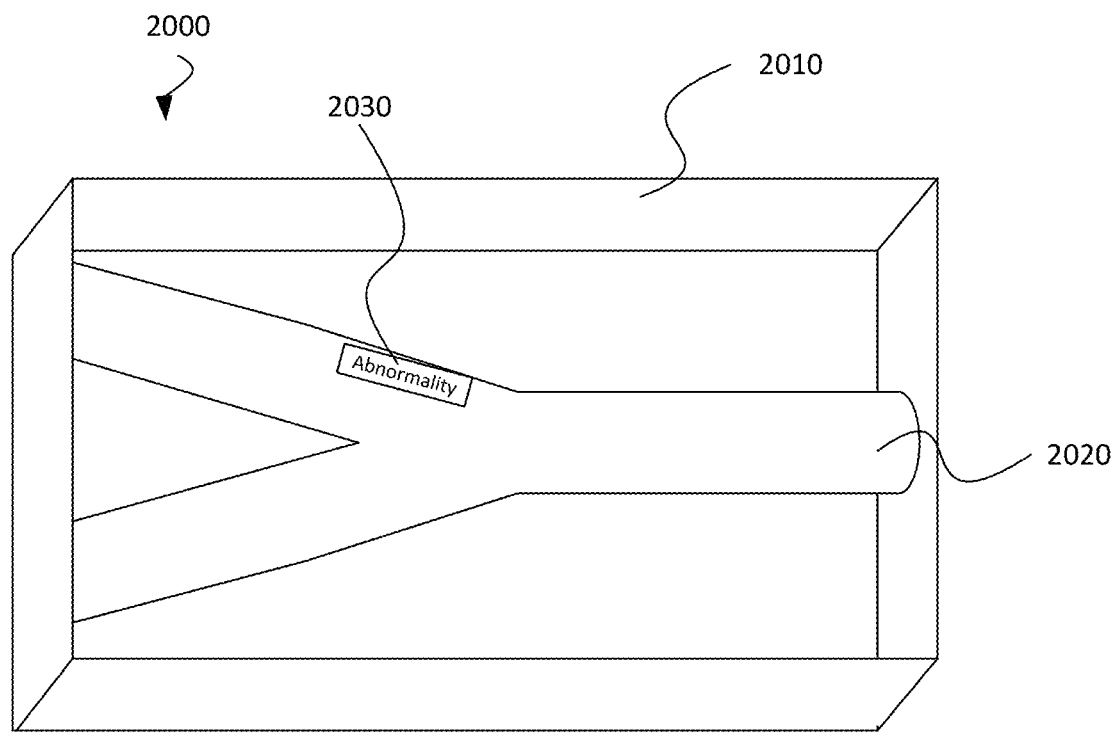
FIG. 20 illustrates another exemplary implementation of a system for surgical simulation.
Figure 21:
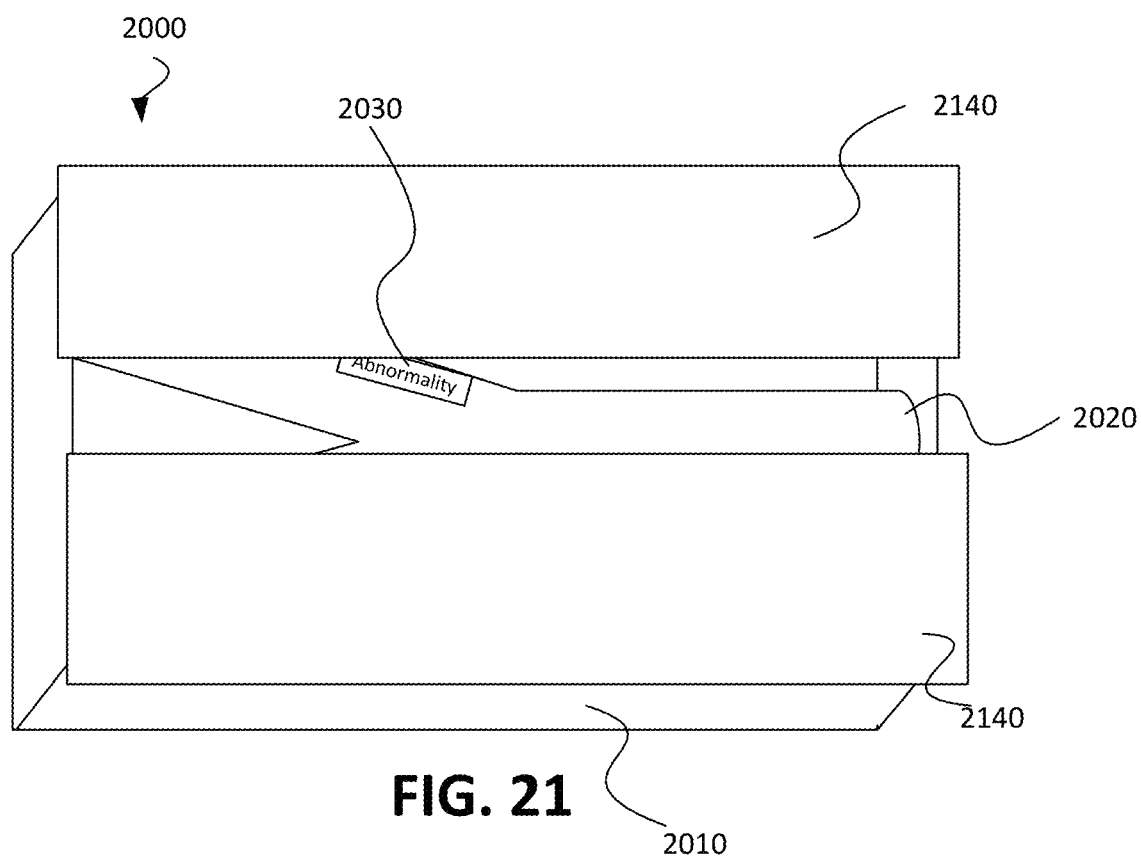
FIG. 21 illustrates an exemplary implementation of the system of FIG. 20 having a simulated skin cover.

FIG. 20 illustrates another exemplary implementation of a system for surgical simulation 2000. System 2000 includes a housing 2010 in the form of a rectangular enclosure. The shape of housing 2010 need only be a configuration suitable for housing one or more desired simulated anatomical components. Housing 2010 includes a simulated anatomical component 2020 in the form of a bifurcated vascular vessel. Vessel 2020 includes a simulated anatomical abnormality 2030, which is formed as a remaining material of an anatomical mold that has been partially removed to form a fluid passageway in vessel 2020. Any simulated anatomical component as per the current disclosure may be used in a housing, such as housing 2010. In one example, vessel 2020 is removably connected to housing 2010 such that vessel 2020 may be replaced by another simulated anatomical component. System 2000 may include other components similar to system 1900, such as tubing, a pump, a reservoir, a simulated skin cover, simulated tissue types, and any combinations thereof, connected and/or connectable to vessel 2020 for allowing fluid flow. One or more of such support components of a simulated surgical system, such as system 1900, 2000, may be included in an additional enclosure associated with the housing containing a simulated anatomical component. Exemplary associations of such enclosures with a housing containing a simulated anatomical component include, but are not limited to, physically separated housing and enclosure having one or more support components with connective tubing for simulated fluid flow between the housing and the enclosure, physical attachment of a housing and an enclosure, a modular housing (e.g., a modular insert as discussed below with respect to FIGS. 28, 29A, 29B, 36A, 36B, 39, 43, 44, 47 and elsewhere) that is removably connectable to an enclosure having one or more support components, and any combinations thereof. FIG. 21 illustrates an exemplary implementation of system 2000 having a simulated skin cover 2140 covering an opening in housing 2010. Simulated skin cover 2140 is shown cut open and pulled back to reveal and provide access to vessel 2020 and abnormality 2030 therein.

Figure 22A:
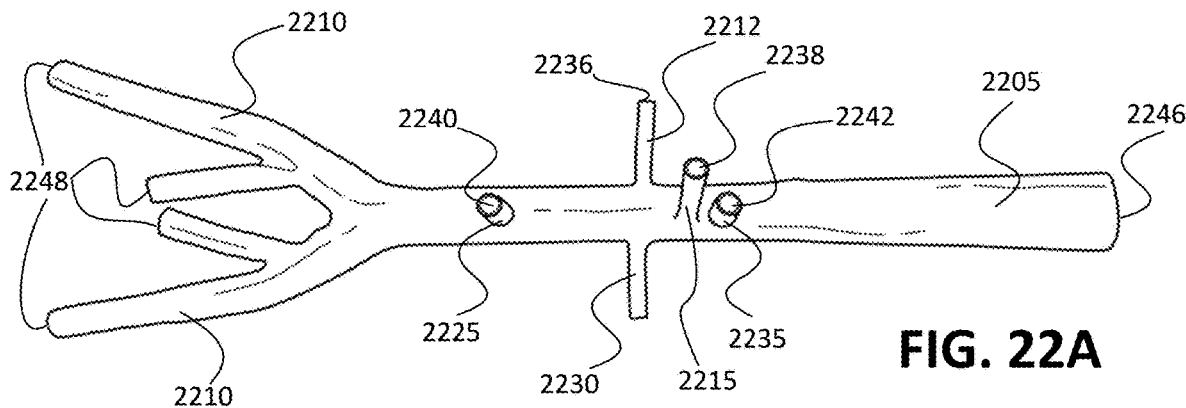
FIG. 22A illustrates a view of yet another exemplary implementation of a simulated vascular vessel.
Figure 22B:
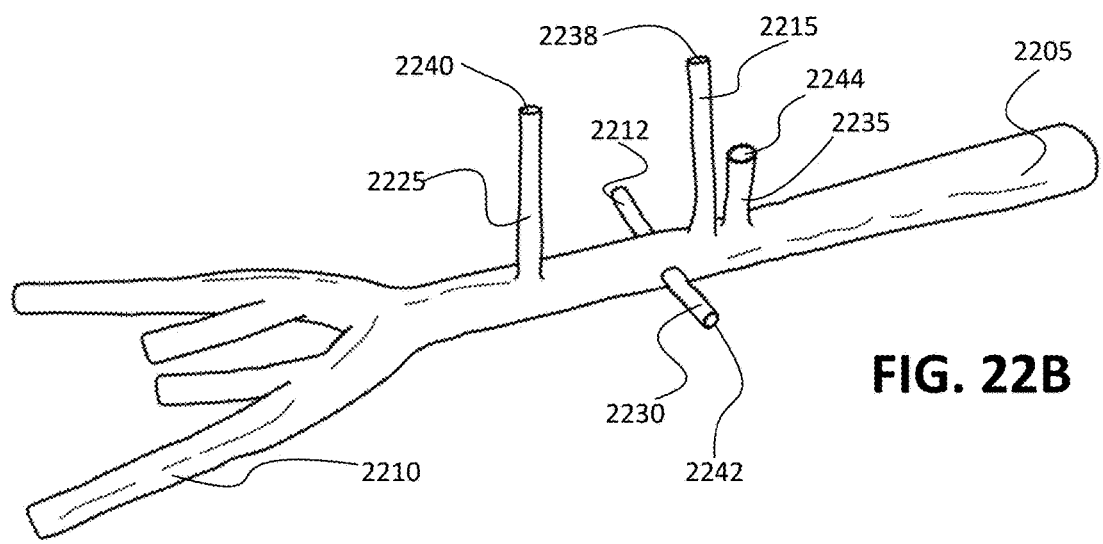
FIG. 22B illustrates another view of the simulated vascular vessel of FIG. 22A.
Figure 22C:
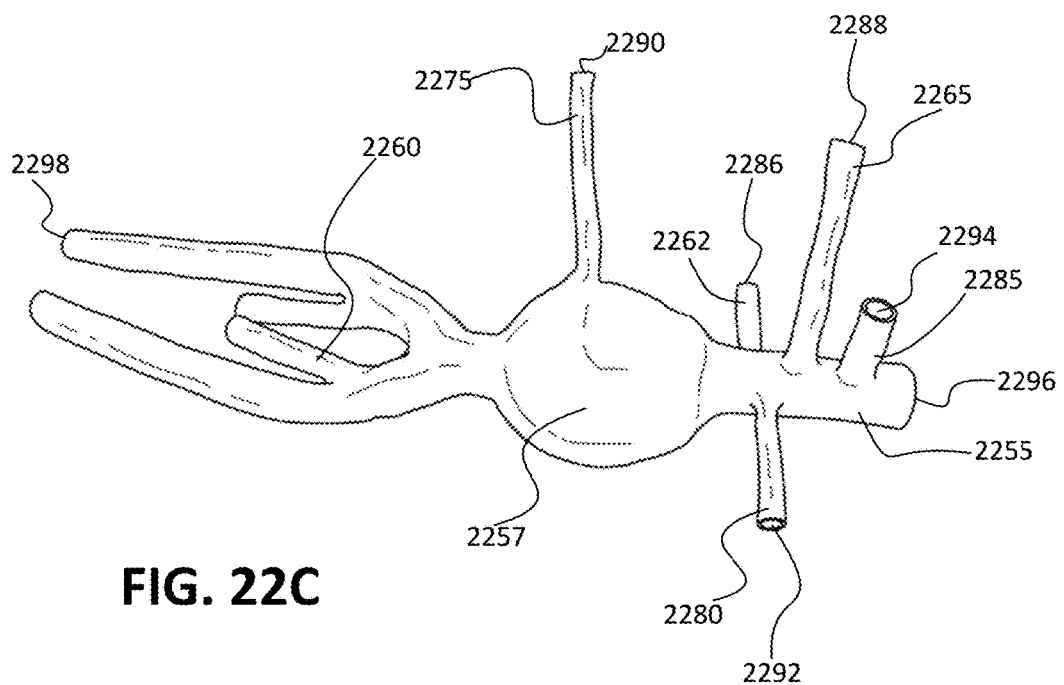
FIG. 22C illustrates a view of still another exemplary implementation of a simulated vascular vessel.
Figure 22D:
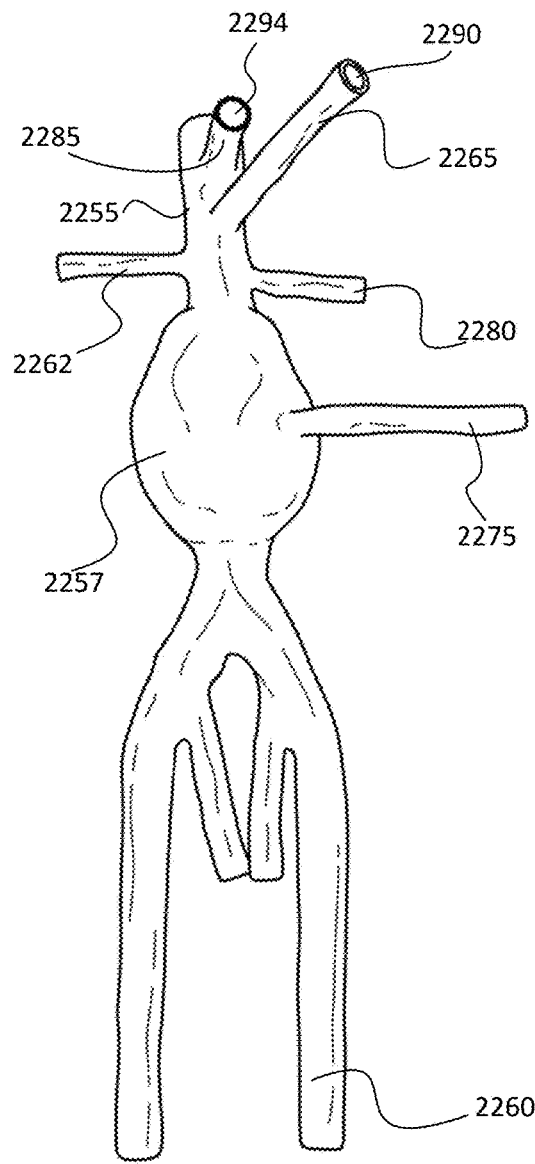
FIG. 22D illustrates another view of the simulated vascular vessel of FIG. 22B.

FIGS. 22A, 22B, 22C, and 22D illustrate two different exemplary simulated anatomical components formed by a method of the current disclosure and in the form of an abdominal aorta vascular vessel. FIGS. 22A and 22B illustrate a first example of a simulated abdominal aorta vascular vessel 2205. FIGS. 22C and 22D illustrate another example of a simulated abdominal aorta vascular vessel 2255 having a large aneurysm 2257. Each of simulated vessels 2205 and 2255 may be utilized as part of a surgical simulation system as disclosed herein (e.g., as part of a modular insert such as those disclosed below) and be connected to one or more support components for simulating bodily fluid flow through one or more of the inner chambers of the vessel. Vessel 2205 includes four branches at one end in the form of simulated iliac arteries 2210 and various additional branches 2212, 2215, 2225, 2230, 2235. Branches 2212, 2215, 2225, 2230, 2235 each have a terminal end 2236, 2238, 2240, 2242, 2244, respectively. Vessel 2205 also has a terminal end 2246 and each of the four simulated iliac arteries 2210 has a terminal end 2248. A simulated vessel, such as vessel 2205, may have terminal ends configured in a variety of ways. In one exemplary configuration, a terminal end of a simulated anatomical component may be configured with an opening into which a fluid flow connector associated with one or more support components (e.g., fluid tubing, a pump, a fluid reservoir, etc.) can be connected. In one such example, a fluid flow connector is in the form of a male insertable connector that can be inserted within the opening of a terminal end. In another exemplary configuration, a terminal end of a simulated anatomical component includes a fluid flow connector that is connected to the terminal end (e.g., via an adhesive, conformal construction with the material of the simulated anatomical component walls, and other connective mechanisms) and configured (e.g., via corresponding shape and size) to mate with a fluid flow connector that is associated with one or more support components (e.g., fluid tubing, a pump, a fluid reservoir, etc.). In yet another exemplary configuration, a terminal end of a simulated anatomical component may include a plug or other blocking mechanism (e.g., having the material of the walls of a simulated vessel formed in a closed fashion, melting of material, clamping, etc.) for preventing flow of fluid from within the simulated anatomical component from that terminal end. It is contemplated that a simulated anatomical component may include a plurality of terminal ends and that a combination of configurations of such terminal ends may exist in the same simulated anatomical component.

Example fluid flow connectors include, but are not limited to, a snap fit connector, a friction fit connector, a twist connector, a male end of a male to female connector, a female end or a male to female connector, a pressure connector, a compression fitting, a self-sealing connector, and any combinations thereof. In one example, a fluid flow connector includes a self-sealing connector, such as a Luer-lock connector. One exemplary aspect of a self-sealing connector is that it can allow disconnection without leakage. In implementations of the current disclosure, such a functionality can allow fluid flow connectors to be disconnected while leaving a pumping mechanism on during disconnection (e.g., a simulated anatomical component having a fluid flow connector for mating to a fluid flow connector of corresponding support components can be disconnected from the corresponding support components while leaving simulated fluid pressure pumping through a system of the current disclosure). Fluid flow connectors can be constructed in a variety of ways. In one example, a fluid flow connector is a friction fit connector configured in shape and size to allow a connection between an end of a simulated anatomical component via a hole in a wall of a modular insert and fluidic tubing (e.g. via a conduit of an insert receiving chamber) of a surgical simulation device. In another example, a fluid flow connector includes one or more tubing components embedded in an end of a simulated anatomical component and configured in a shape and size to allow a connection of the end of the simulated anatomical component to one or more corresponding fluid flow connectors of a surgical simulation device as disclosed herein and fluidic tubing (e.g., via a conduit of an insert receiving chamber) of a surgical simulation device. Various other variations of constructions and examples are possible and are understandable in light of the teachings herein.

Referring again to FIGS. 22C and 22D, simulated vessel 2255 includes an aneurysm 2257. In one example, an aneurysm, such as aneurysm 2257, or other non-standard formation in size or shape of a simulated anatomical component is formed by an anatomical mold of the current disclosure. Simulated vessel 2255 also includes four branches at one end in the form of simulated iliac arteries 2260 and various additional branches 2262, 2265, 2275, 2280, 2285. Branches 2262, 2265, 2275, 2280, 2285 each have a terminal end 2286, 2288, 2290, 2292, 2294, respectively. Vessel 2255 also has a terminal end 2296 and each of the four simulated iliac arteries 2260 has a terminal end 2298.

Either of simulated vessels 2205, 2255 may include one or more simulated anatomical abnormalities included within a cavity of the vessel (e.g., formed by a remaining portion of an anatomical mold as described herein).

Figure 23:
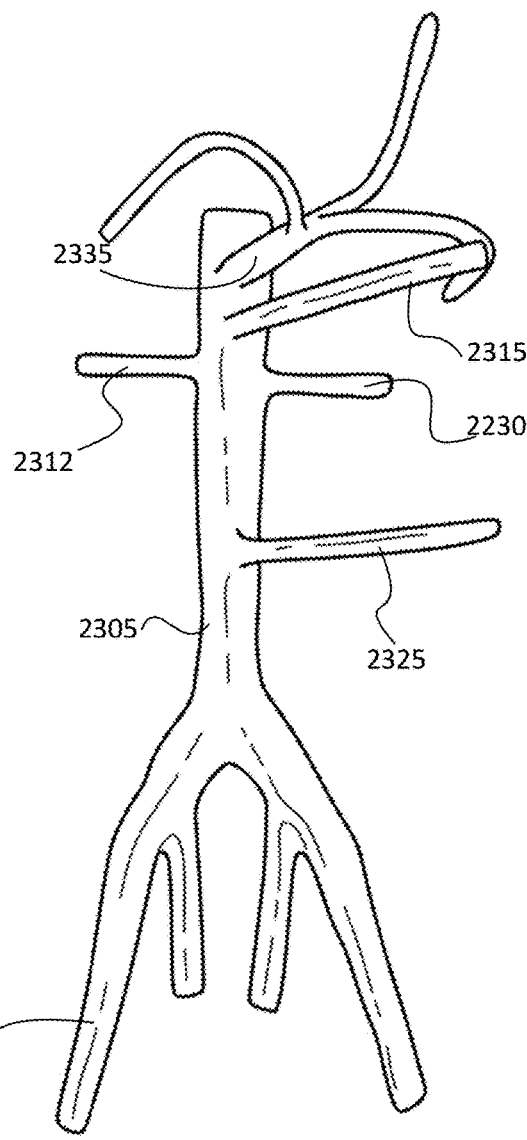
FIG. 23 illustrates still yet another exemplary implementation of a simulated vascular vessel.

FIG. 23 illustrates another exemplary simulated anatomical component 2305 formed by a method of the current disclosure and in the form of an abdominal aorta vascular vessel having a celiac trunk with branches. Like simulated vessels 2205 and 2255, simulated vessel 2305 includes four branches at one end in the form of simulated iliac arteries 2310 and various additional branches 2312, 2315, 2325, 2330, each branch having a terminal end. Simulated vessel 2305 also includes a branch in the form of a celiac trunk 2335 having three branches therefrom, each branch with a terminal end.

Figure 24:
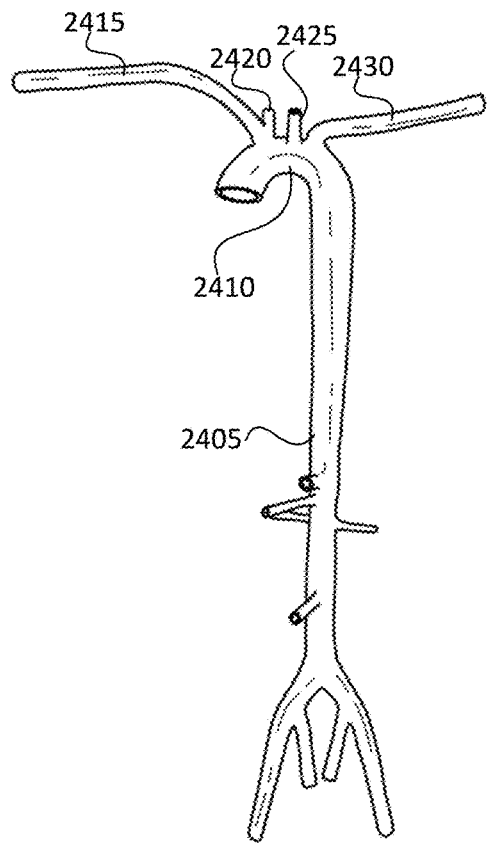
FIG. 24 illustrates a further exemplary implementation of a simulated vascular vessel.

FIG. 24 illustrates yet another exemplary simulated anatomical component 2405 formed by a method of the current disclosure and in the form of an abdominal aorta vascular vessel having a celiac trunk with branches and an aortic arch Like simulated vessels 2205, 2255, and 2305 simulated vessel 2405 includes four branches at one end in the form of simulated iliac arteries and various additional branches each branch having a terminal end. At the opposite end from the iliac arteries, simulated vessel 2405 also includes a simulated aortic arch 2410, which has four branches 2415, 2420, 2425, 2430, each branch with a terminal end.

Figure 25:
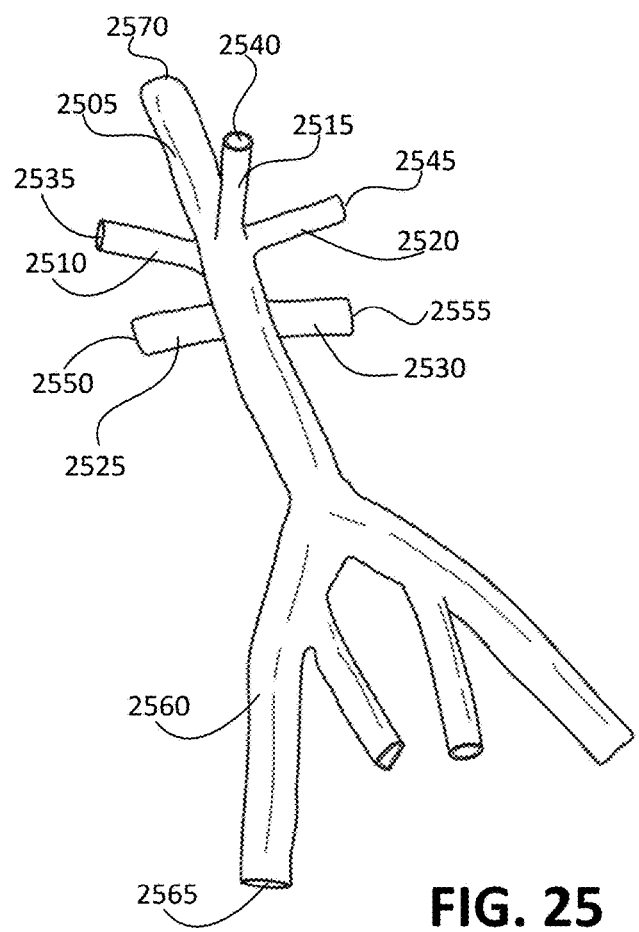
FIG. 25 illustrates still a further exemplary implementation of a simulated vascular vessel.

FIG. 25 illustrates still another exemplary simulated anatomical component 2405 formed by a method of the current disclosure and in the form of an inferior vena cava vascular vessel. Simulated vessel 2505 includes various branches 2510, 2515, 2520, 2525, 2530, each with a terminal end 2535, 2540, 2545, 2550, 2555, respectively. At one end of simulated vessel 2505 is a bifurcated branched section 2560 having four branches, each branch having a terminal end 2565. At an end opposite section 2560, simulated vessel 2505 includes a terminal end 2570.

Figure 26:
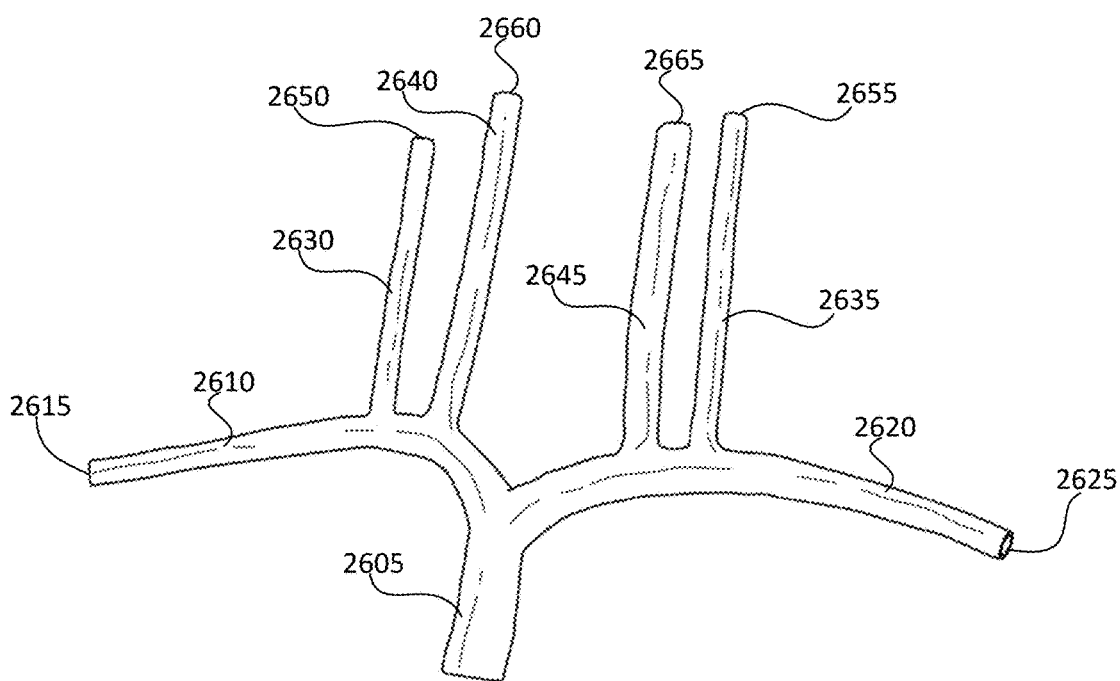
FIG. 26 illustrates yet a further exemplary implementation of a simulated vascular vessel.

FIG. 26 illustrates still yet another exemplary simulated anatomical component 2505 formed by a method of the current disclosure and in the form of simulated vessels 2605 of the venous system of the human neck and chest. Simulated vessels 2605 includes two main branches: a branch 2610 having a terminal end 2615 and a branch 2620 having a terminal end 2625. The main branches 2610, 2620 have additional branches in the form of simulated exterior jugular veins 2630 2635 and simulated interior jugular veins 2640, 2645. Simulated veins 2630, 2635, 2640, 2645 each have a terminal end 2650, 2655, 2660, 2665, respectively.

Simulated vessels 2305, 2405, 2505, 2605 each may have terminal ends with one or more of the configurations discussed herein. Simulated vessels 2305, 2405, 2505, 2605 each may be utilized as part of a surgical simulation system as disclosed herein (e.g., as part of a modular insert such as those disclosed below) and be connected to one or more support components for simulating bodily fluid flow through one or more of the inner chambers of the vessel via one or more of its terminal ends. Simulated vessels 2305, 2405, 2505, 2605 each may include one or more simulated anatomical abnormalities included within a cavity of the vessel (e.g., formed by a remaining portion of an anatomical mold as described herein).

Figure 27:
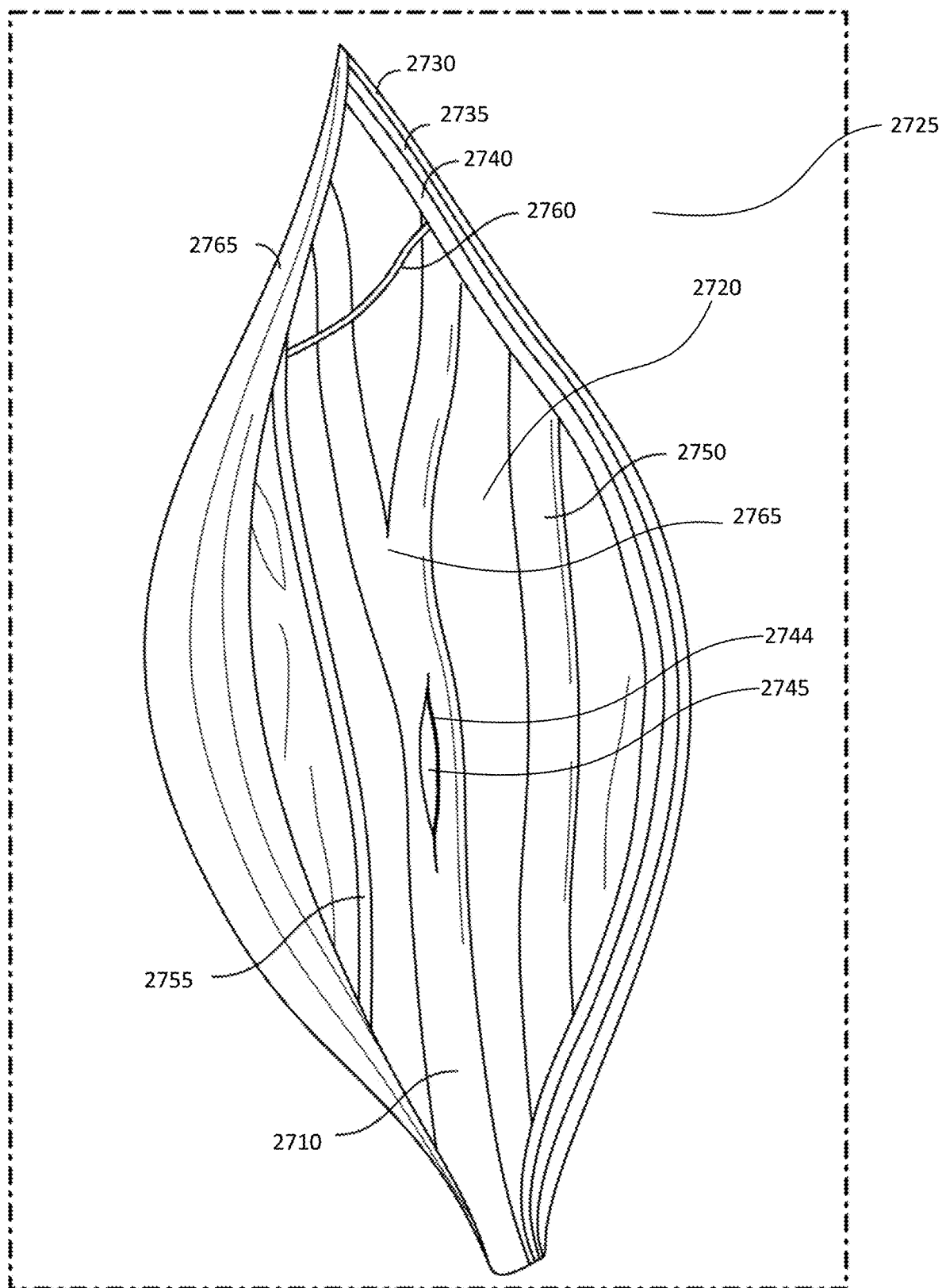
FIG. 27 illustrates a partial view of a further exemplary implementation of a surgical simulation system showing still yet a further exemplary implementation of a simulated vascular vessel.

FIG. 27 illustrates a partial view of a further surgical simulation system showing yet still another example implementation of a simulated vascular vessel 2710, which is formed by one of the methods described herein. Vessel 2710 is shown through an opening 2720 in the surface 2725 of a simulated skin that includes three layers: a skin layer 2730, an adipose tissue layer 2735, and a thin muscle layer 2740. Vessel 2710 is shown as a bifurcated vessel having a bifurcation 2742. In one example, vessel 2710 may simulate a carotid artery. A small incision 2744 in vessel 2710 shows a simulated anatomical abnormality 2745 in the form of a plaque inside vessel 2710. Additional components of the exemplary surgical simulation system are also shown, including a second simulated vascular vessel 2750 and simulated nerves 2755 and 2760. In one example, vessel 2750 may simulate a jugular vein and simulated nerves 2755 and 2760 may simulate a Vagus nerve and Hypoglossal nerve. Also shown is the sternocleidomastoid muscle 2765.

The example shown in FIG. 27 shows exemplary aspects of a system which approximates the behavior of real skin, organs, tissues, and a blood vessel having a plaque therein. Example implementations of the current disclosure may provide a useful tool for individuals to practice surgical procedures (including but not limited to removal of atherosclerotic plaque) and to practice suturing of tissues (where the suturing behaves in a fashion similar to that in live human tissue). Such examples may allow for the user to practice different procedures multiple times by replacing components (such as vessels and tissues) as needed. In certain exemplary implementations, a beneficial aspect may include a user being able to practice an entire surgical procedure in a compact and portable product (e.g., a system as disclosed herein including fluid flow and relevant anatomical reference structures). These aspects and others may be present in one or more of the examples, implementations, and embodiments of this disclosure.

A surgical simulation system according to the current disclosure may include a housing (such as housings 1910, 2010 for example) that includes one or more simulated anatomical components wherein the housing is configured to be a modular insert to a simulation device that includes support components for the surgical simulation system. Any of the implementations, embodiments, characteristics, features, environmental interactions, etc. of the simulated anatomical components discussed above can be combined with the modularity of a housing. Examples of a support component include a connective tubing, a pump, electronics, an electronic control circuit, a power source, a fluid reservoir, a power switch, and any combinations thereof.

Figure 28:
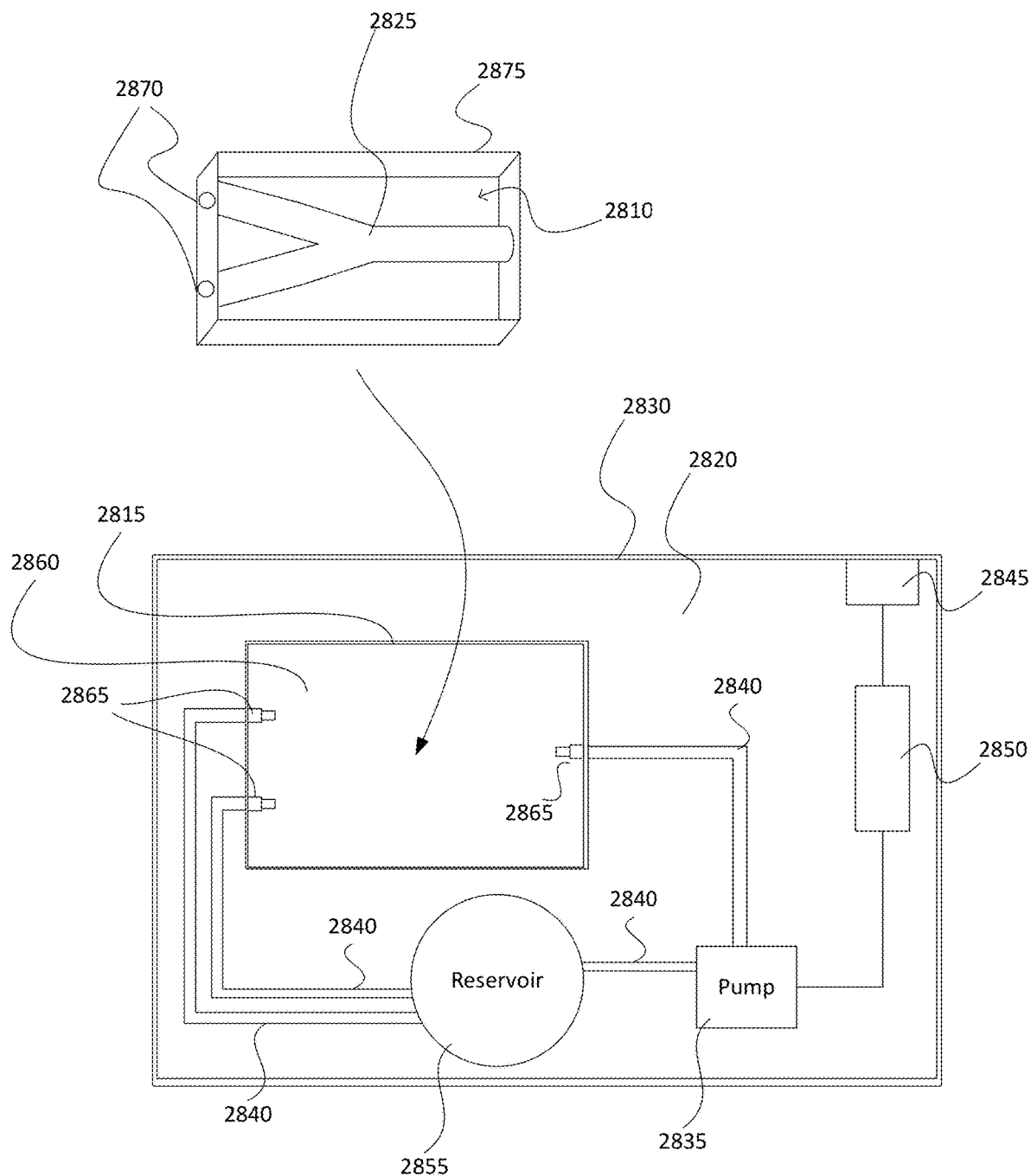
FIG. 28 illustrates an exemplary implementation of a modular insert and surgical simulation system.

FIG. 28 illustrates an example implementation of a housing 2810 in the form of a modular insert to an insert receiving chamber 2815 of a surgical simulation system 2820. Modular insert 2810 is shown with a simulated anatomical component 2825 that is shown in the form of a bifurcated vascular vessel but could be any other one or more simulated anatomical component. A modular insert (e.g., modular insert 2810) may include one or more simulated anatomical components of various types. Such simulated anatomical components for a modular insert may have one or more features, subcomponents, and/or characteristics of a simulated anatomical component as described herein or be a different simulated anatomical component. Additionally, a simulated anatomical component for a modular insert may be formed according to a method that includes a method of the current disclosure and/or according to another method. A modular insert, such as modular insert 2810, may have a simulated skin cover (e.g., as discussed above with respect to other housing implementations). Such a simulated skin cover may be adhered to the top of a modular insert, be part of the same structural material as one or more of the side walls of modular insert, and/or be attached using one or more other known techniques. In one example, such a simulated skin cover may be removably attached to a modular insert. In another example, such a simulated skin cover may be non-removably attached to a modular insert.

Surgical simulation system 2820 in FIG. 28 is shown as a two-dimensional, top view, line drawing intended to describe the general interrelationships between components and it is contemplated that such a system can take various three-dimensional forms with structures, enclosures, etc. capable of implementing the concepts described herein with respect to a modular insert. Surgical simulation system 2820 includes an enclosure 2830 that includes a pump 2835, connective tubing 2840, a power supply 2845, supporting electronics 2850, and a fluid reservoir 2855. Insert receiving chamber 2815 is configured to receive modular insert 2810. In this example, insert receiving chamber 2815 includes an opening 2860 shaped and sized to receive modular insert 2810 such that a top opening in modular insert 2810 remains exposed to the outside of enclosure 2830. An insert receiving chamber, such as insert receiving chamber 2815, includes one or more fluid flow connectors for connecting one or more simulated anatomical components within a modular insert to connective tubing of a surgical simulation system. For example, insert receiving chamber 2815 is shown with fluid flow connectors 2865 for connecting to connective tubing 2840 and to one or more holes 2870 in one or more of the walls 2875 of modular insert 2810. One or more holes, such as holes 2870 allow connection of a simulated anatomical component to the fluid flow components (e.g., fluid reservoir, pump, and connective tubing) to allow for simulated fluid to flow through an interior cavity of the simulated anatomical component. Simulated anatomical component 2825 is shown as a bifurcated vascular vessel having two ends, each connected to one of the holes 2870 in one or the walls 2875 of modular insert 2810, and a single end connected to another of holes 2870 (not shown) in an opposite wall of walls 2875. A modular insert, such as modular insert 2810, may also include one or more fluid flow connectors (not shown) in place of and/or in combination with holes 2870 and configured to connect to one or more corresponding fluid flow connectors of an enclosure (e.g., enclosure 2830) of a surgical simulation system, such as fluid flow connectors 2865 and those disclosed in other implementations herein. When modular insert 2825 is inserted into insert receiving chamber 2815 the fluid flow connectors 2865 are connected via holes 2870 to create a fluidic connection to connective tubing 2840, pump 2835, and reservoir 2855. In use, fluid from reservoir 2855 flows through simulated anatomical component 2825. Such fluid flow can be useful in surgical simulation as described throughout the current disclosure.

Examples of supporting electronics, such as supporting electronics 2850, include, but are not limited to, an on/off switch (e.g., for controlling the state of a fluidic pump), on/off switching circuitry for an on/off switch, connective electronics for other components, electronics for status indicators, status indicators, a control circuit, a processor, a microcontroller (e.g., a Trinket branded microprocessor available from Adafruit Industries of New York, NY, an Arduino branded microprocessor available from Arduino of Somerville, MA), electronics for power supply, and any combinations thereof.

An insert receiving chamber, such as insert receiving chamber 2815, may itself be removable from a surgical simulation system, such as system 2820. Example benefits to removability of an insert receiving chamber include, but are not limited to, allowing different configurations of insert receiving chambers for receiving differently configured modular inserts (e.g., having different configurations of fluid flow connectors), allowing cleaning, allowing a user to easily practice a wide variety of surgical procedures, allowing a user to easily practice procedures multiple times, and any combinations thereof. In an example in which an insert receiving chamber is removable, the enclosure of the surgical simulation system includes an opening shaped and configured to receive the insert receiving chamber. Various opening types and configurations will be understood based on the size, configuration, simulation requirements, and other system characteristics of one or more modular inserts and the surgical simulation system design generally. Additionally, various connectors for removably attaching an insert receiving chamber to an enclosure of a surgical simulation system will also be understood. Examples of a connector for removably attaching an insert receiving chamber include, but are not limited to, a screw, a friction fitting, a snap fitting, a clamp down connector, and any combinations thereof.

An insert receiving chamber, such as chamber 2815, may include side walls that are dimensioned to receive a modular insert, such as insert 2810. Such side walls of an insert receiving chamber can hold in place the side walls of a modular insert during a surgical simulation. In one example, the sizing and dimensioning of the side walls of an insert receiving chamber are designed to match the sizing and dimensioning of the side walls of a modular insert that is intended to be used with the insert receiving chamber (e.g., allowing a formed fit of the modular insert into the insert receiving chamber that minimizes movement of the modular insert and allows connection of any fluid flow connectors to corresponding ends of a simulated anatomical component of the modular insert). In the examples illustrated herein, modular inserts and insert receiving chambers are shown as rectangular shaped. Other shapes (e.g., circular, oval, square, etc.) are contemplated. Additionally, any number of fluid flow connectors may be included in an insert receiving chamber to match the number of ends of one or more simulated anatomical components of a modular insert intended to be utilized with the insert receiving chamber. For example, some of the illustrations herein show two fluid flow connectors at one end of an insert receiving chamber and on fluid flow connector at another end of an insert receiving chamber (e.g., for use with a bifurcated simulated vascular vessel). Other configurations of simulated anatomical components in a modular insert are contemplated to match with corresponding configurations of fluid flow connectors of an insert receiving chamber (e.g., sizing, shape, number, and positioning of holes in walls of modular insert, ends of simulated anatomical components, and connectors of fluid flow connectors). One such example would include two fluid flow connectors at one end of an insert receiving chamber and two fluid flow connectors at another end of an insert receiving chamber (e.g., for use with a modular insert including simulated anatomical component(s) for simulating anastomosis).

An insert receiving chamber can include fluid conduit to merge multiple fluid flow connectors into one or more connectors of the insert receiving chamber that are designed to connect the insert receiving chamber to a simulated surgical device, such as system 2820 (e.g., where the insert receiving chamber is removable from an enclosure, such as 2830). Such conduit can allow for variations in the number and positioning of fluid flow connectors in an insert receiving chamber while having a fixed number and positioning of connectors on different insert receiving chambers to match a fixed number and positioning of connectors in the simulated surgical system device for receiving removably connectable insert receiving chambers of different configurations.

An insert receiving chamber may include removable fluid flow connector sections. In one such example, a side wall section of an insert receiving chamber that includes one or more fluid flow connectors (and corresponding verging conduit) may be removable from other portions of the insert receiving chamber. In another example, an insert receiving chamber may include multiple removable fluid flow connector sections. In one such example, a side wall section having one or more fluid flow connectors at one end of an insert receiving chamber may be removable from other portions of the insert receiving chamber and a second side wall section having one or more fluid flow connectors at another end of the insert receiving chamber may also be removable from other portions of the insert receiving chamber. Each removably connectable fluid flow connector section then can be modularly removed and replaced with a section having a different number, positioning and configuration of fluid flow connectors (e.g., allowing for modifying an insert receiving chamber to receive differently configured modular inserts, such as for changing the type of surgical simulation to be utilized with a surgical simulation system).

Various examples of a receiving chamber are illustrated herein showing a receiving chamber with side walls and a floor structure. It is contemplated that other configurations of a receiving chamber will be understood from the current disclosure that are capable of receiving a modular insert (e.g., without a floor structure).

Figure 29A:
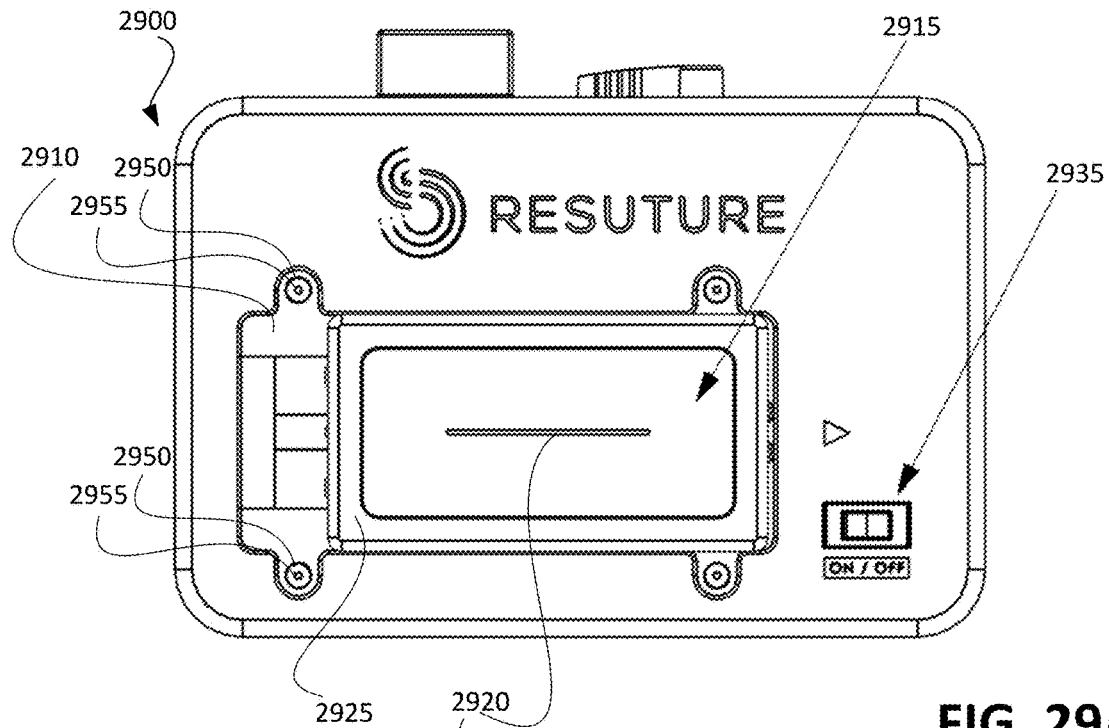
FIG. 29A illustrates a top view of another exemplary implementation of a surgical simulation system.
Figure 29B:
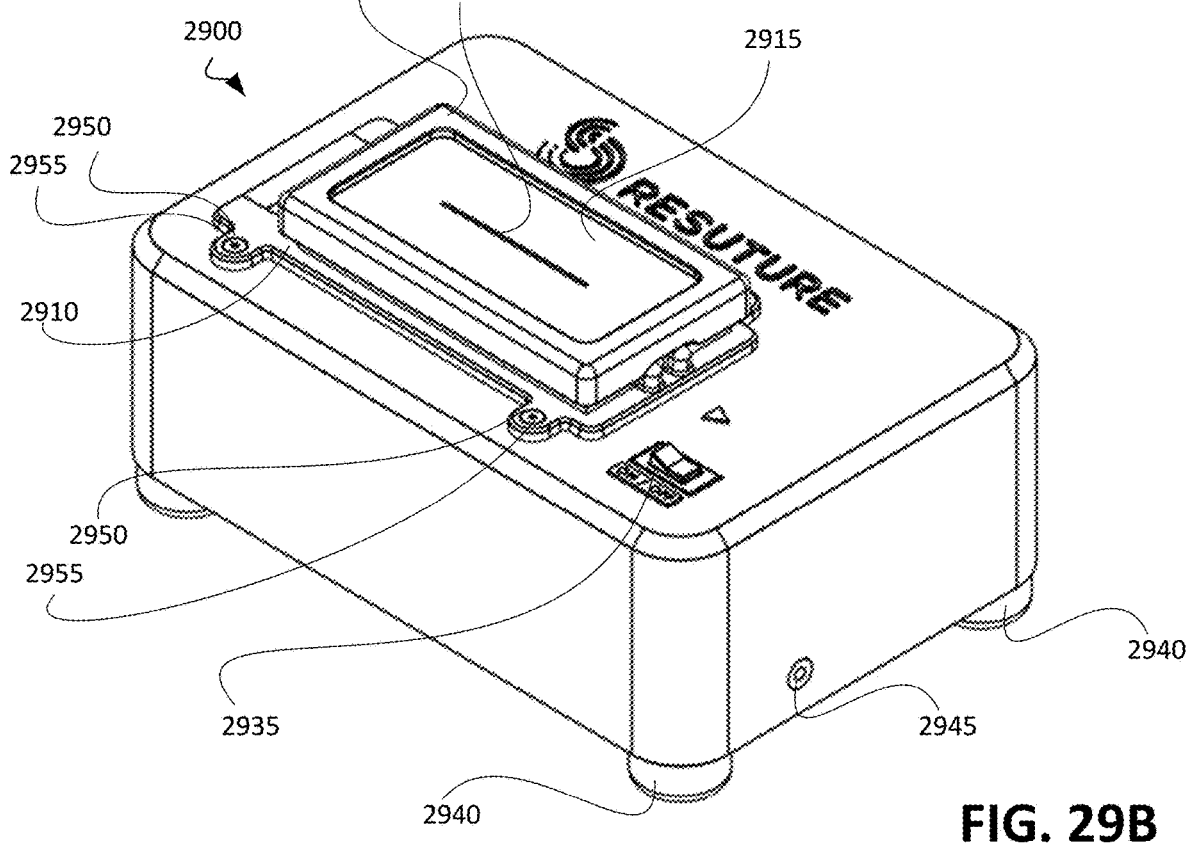
FIG. 29B illustrates an isomeric view of the exemplary surgical simulation system of FIG. 29A.
Figure 37A:
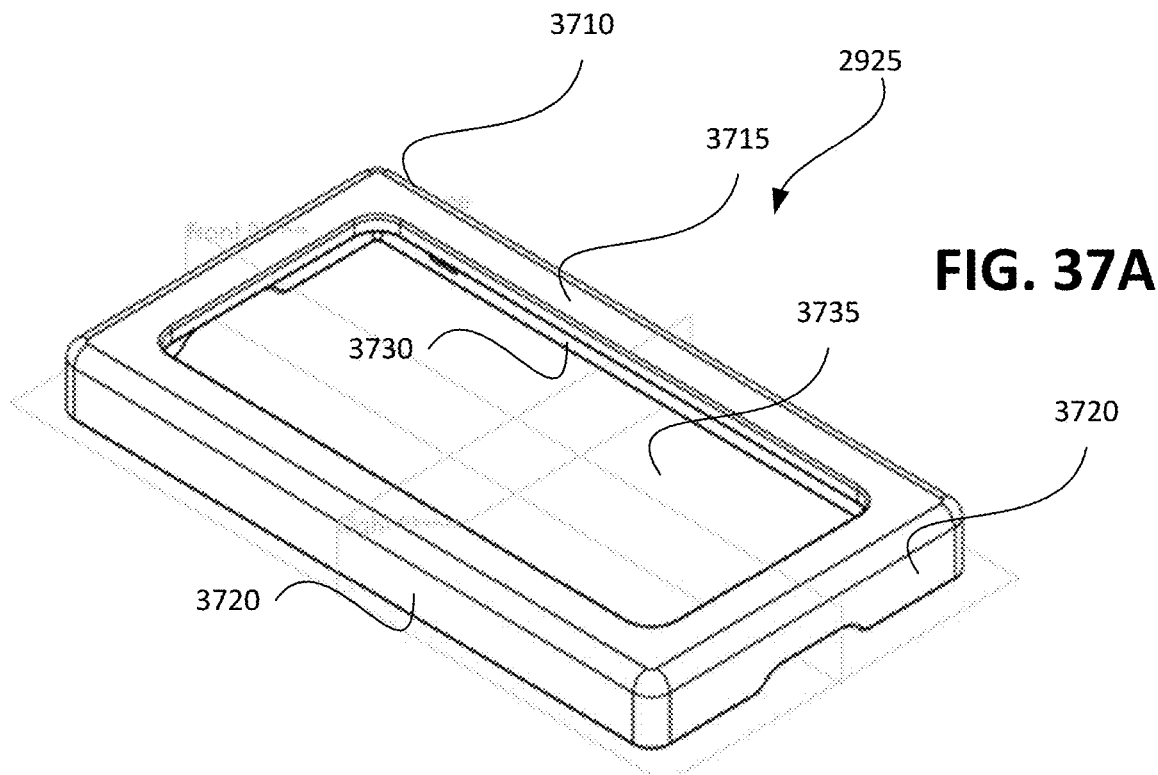
FIG. 37A illustrates an exemplary implementation of a chamber clamp.
Figure 37B:
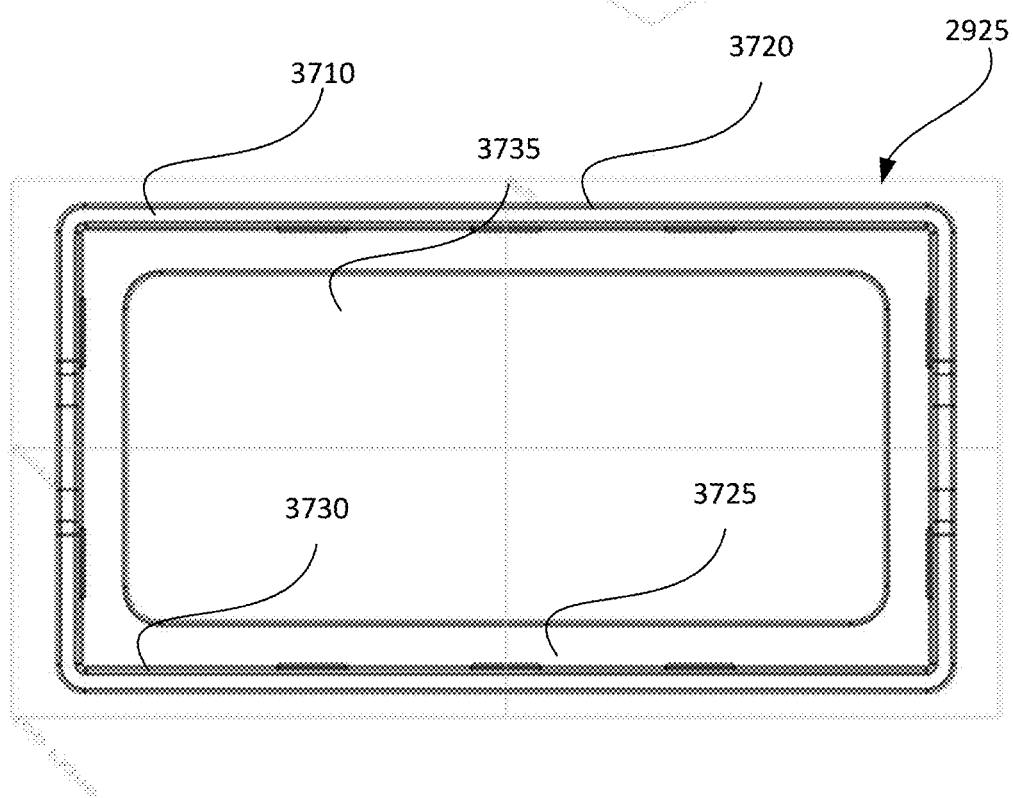
FIG. 37B illustrates another view of the exemplary chamber clamp of FIG. 37A.

FIG. 29A illustrates a top view line drawing of an example of a surgical simulation system 2900 with removable modular insert and removably connectable insert receiving chamber. FIG. 29B illustrates an isometric view of system 2900. System 2900 is shown with a removably connectable insert receiving chamber 2910 that has a modular insert 2915 therein. Modular insert 2910 is shown having a simulated skin cover 2917 on top with a slit opening 2920 for accessing internal components (e.g., one or more simulated vessels) of modular insert 2910 (e.g., for performing various surgical simulations without incision). In alternative examples, a modular insert may have a simulated skin cover without a slit opening, thereby allowing a user to make one or more incisions in the simulated skin cover. A chamber clamp 2925 is affixed to the top of insert receiving chamber 2910. A chamber clamp is an optional component for providing a restraining to a modular insert in an insert receiving chamber. In various examples, a chamber clamp may also provide tension to a simulated skin cover to assist with simulating the behavior of actual skin tissue during simulated surgical procedures. FIGS. 37A and 37B illustrate an example of a chamber clamp. In the example in FIGS. 29A and 29B, chamber clamp 2925 uses size and dimensional configuration that is matched to the size and dimensions of modular insert 2915 to provide a friction fit.

System 2900 also includes an enclosure 2930 that encloses internal components (e.g., pump, power source, connective tubing, connectors for connecting to conduit of insert receiving chamber 2910, reservoir, etc.). An on/off switch 2935 is shown on an outer surface of enclosure 2930. On/off switch 2935 is connected to internal components for switching the power state of a pump and the fluid flow through one or more simulated anatomical components of modular insert 2915. System 2900 includes feet 2940, and an input 2945 for connecting an external power supply to internal power source circuitry.

Insert receiving chamber 2910 includes four screw connections 2950 with screws 2955 holding insert receiving chamber 2910 to enclosure 2930.

Figure 30:
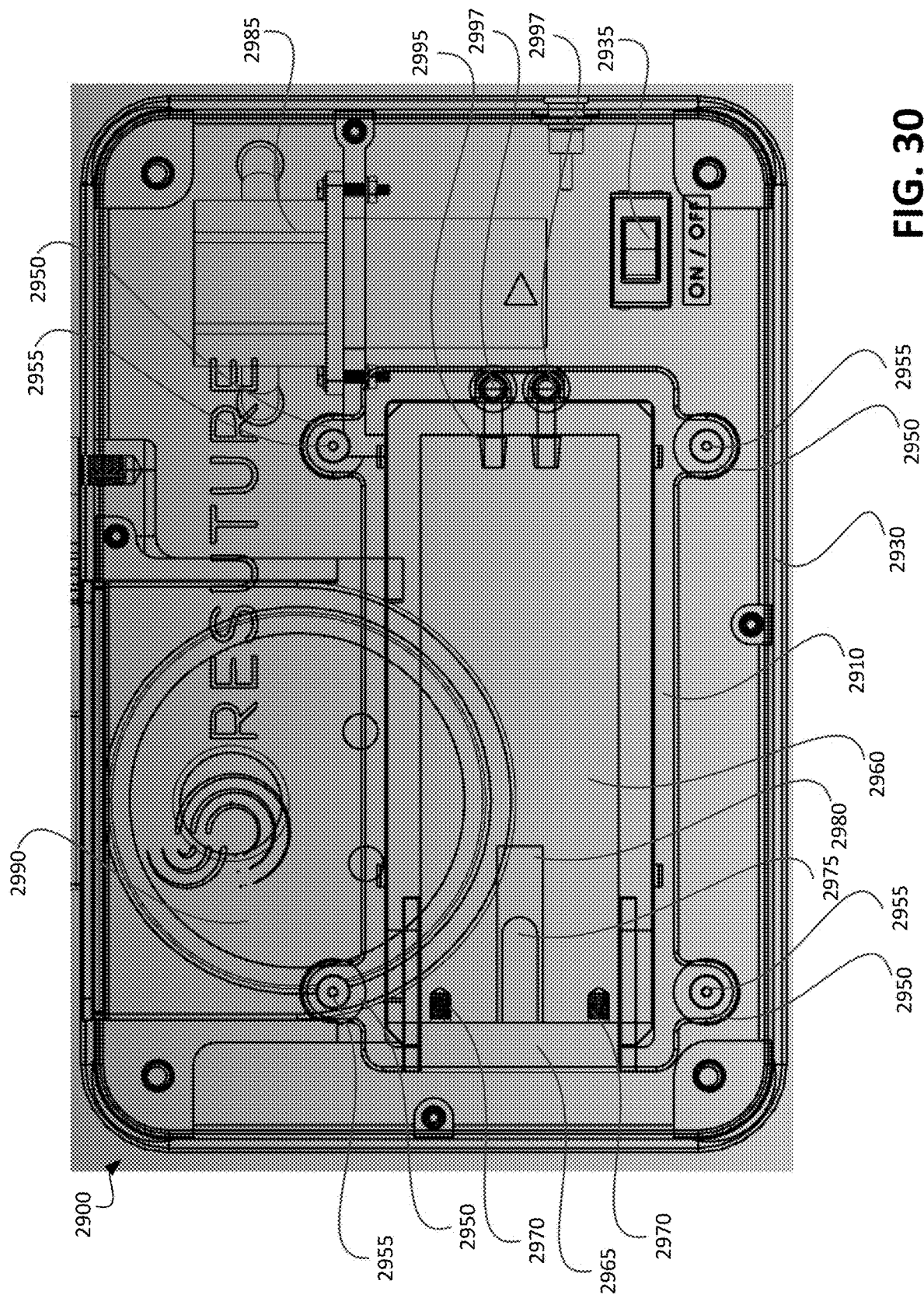
FIG. 30 illustrates a top view semi transparent line drawing of the exemplary surgical simulation system of FIG. 29A.

FIG. 30 illustrates a top view semi-transparent line drawing of system 2900 showing an outline of insert receiving chamber 2910 (without a modular insert therein) and internal components of system 2900. Insert receiving chamber 2910 is shown with screw connections 2950 attached to enclosure 2930 using screws 2955. Insert receiving chamber 2910 is shown with a first section 2960 and a second section 2965 that is a removable fluid flow connector section. Removable fluid flow connector section 2965 is attached to insert receiving chamber 2910 via screws 2970. Other attachment mechanisms can be employed. Removable fluid flow connector section 2965 is configured to be able to slide laterally to change the length of insert receiving chamber 2910 (e.g., using a mechanism that includes a tongue feature 2975 that slides in slot 2980). This lateral sliding of section 2965 can occur without detaching insert receiving chamber 2910 from enclosure 2930. In another exemplary aspect, this lateral sliding provides an ability to change the dimension of insert receiving chamber 2910 to be larger than a dimension of a modular insert designed to be inserted in insert receiving chamber 2910 for removal of the modular insert and to change the dimension of insert receiving chamber 2910 to be the same as the modular insert once the modular insert is in the insert receiving chamber 2910.

FIG. 30 also illustrates on/off switch 2935, pump 2985, and fluid reservoir 2990. Internal connective tubing that would be used to connect fluid flow connectors 2995 of insert receiving chamber via conduit connectors 2997 to pump 2985 and fluid reservoir 2990 to allow fluid flow through one or more simulated anatomical components in a modular insert connected to fluid flow connectors 2995 is not shown.

Figure 31:
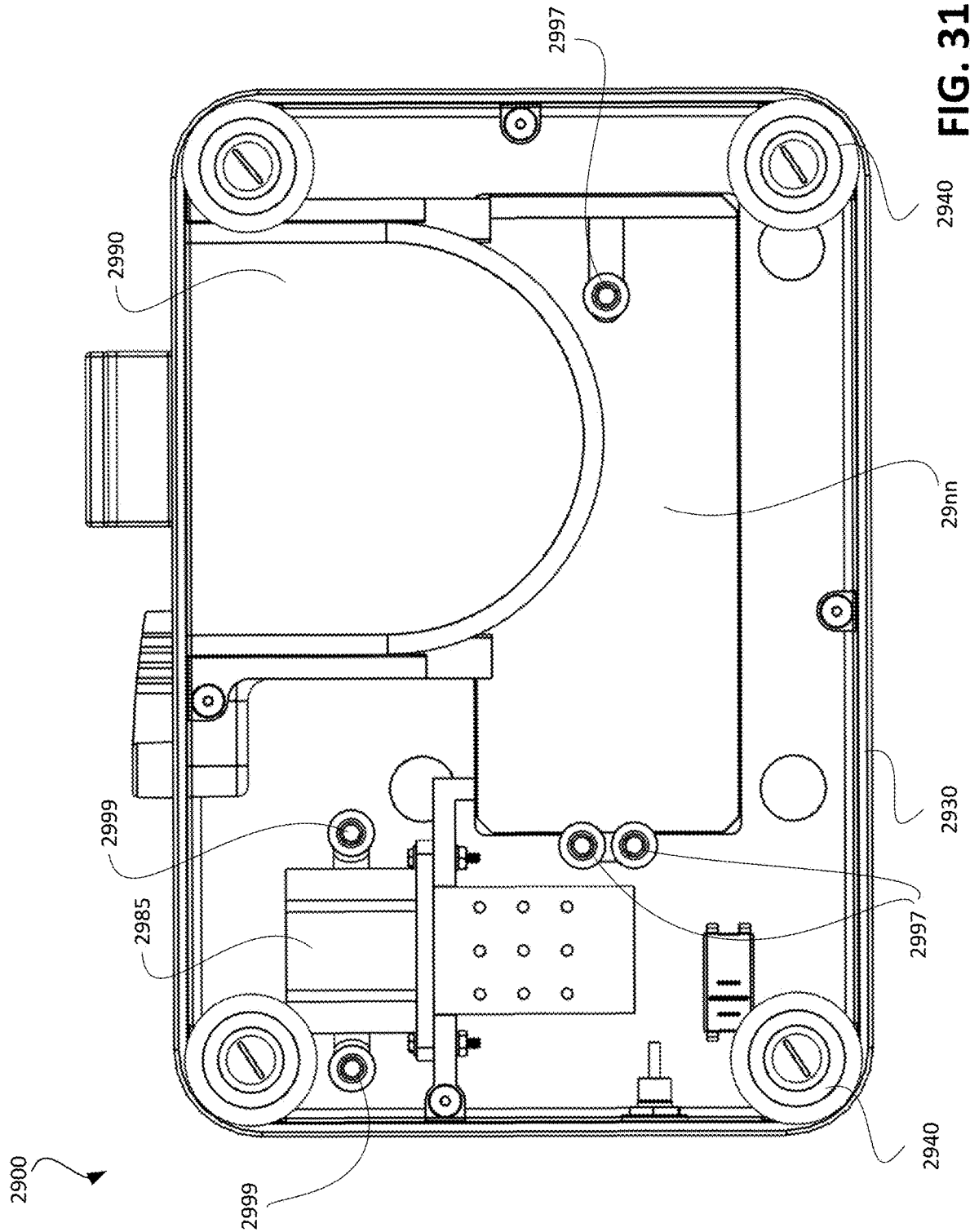
FIG. 31 illustrates a bottom view line drawing of internal components of the exemplary surgical simulation system of FIG. 29A.

FIG. 31 illustrates a bottom view line drawing of internals of system 2900 showing the bottom of insert receiving chamber 2910 with conduit connectors 2997 for connecting to internal connective fluidic tubing. System 2900 is also shown with enclosure 2930, pump 2985, four feet 2940 and fluid reservoir 2990. Pump 2985 is shown with connectors 2999 for connecting pump 2985 to connective tubing that connects (directly and/or indirectly) to reservoir 2990 and conduit connectors 2997.

Figure 32A:
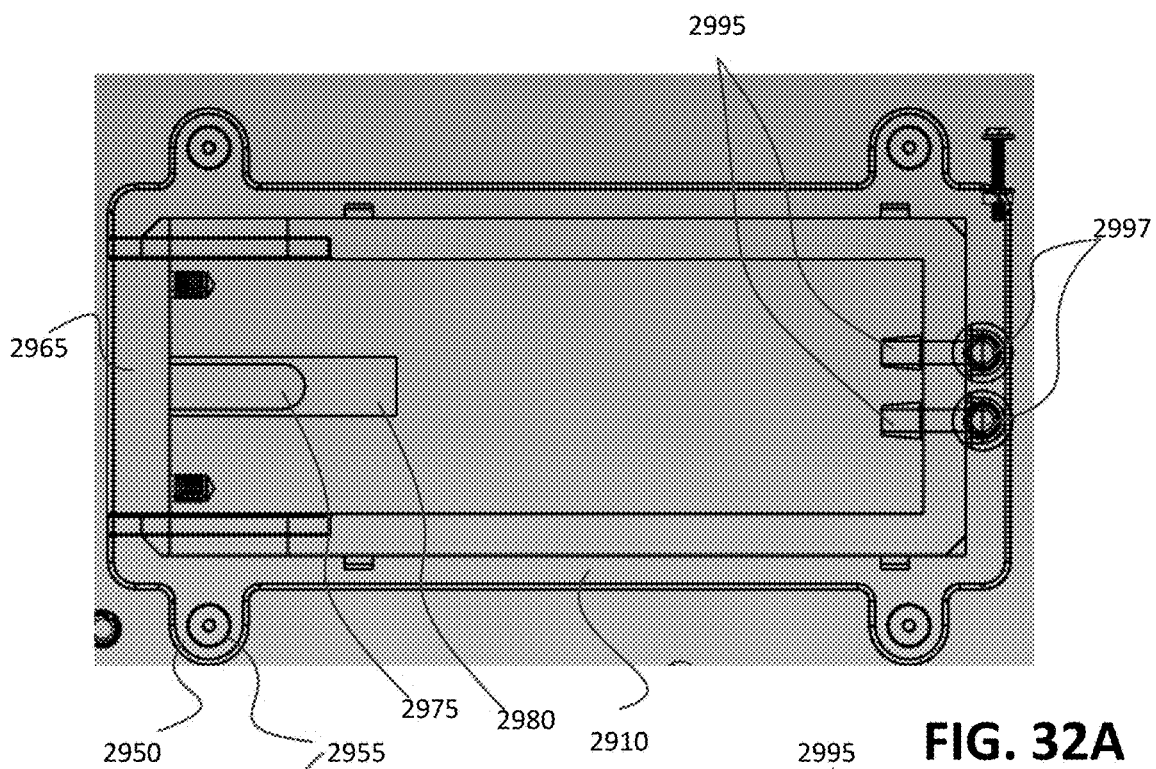
FIG. 32A illustrates a top view of an exemplary implementation of an insert receiving chamber.

FIG. 32A illustrates a top view line drawing of insert receiving chamber 2910 with removable fluid flow connector section 2965 (not showing the fluid flow connector that is part of section 2965) connected to first section 2960 of insert receiving chamber 2910. First section 2960 is shown with two fluid flow connectors 2995 and conduit connectors 2997. Each of fluid flow connectors 2995 is connected to corresponding one of conduit connectors 2997 with a fluid conduit that is part of insert receiving chamber 2910. Insert receiving chamber 2910 is shown with four screw connections 2950 with screws 2955 in each of screw connections 2950. First section 2960 includes slot 2980. Removable fluid flow connector section 2965 includes a tongue 2975 that slides in slot 2980 to allow the wall of removable fluid flow connector section 2965 to slide laterally to change the length dimension of the inner portion of insert receiving chamber 2910.

Figure 32B:
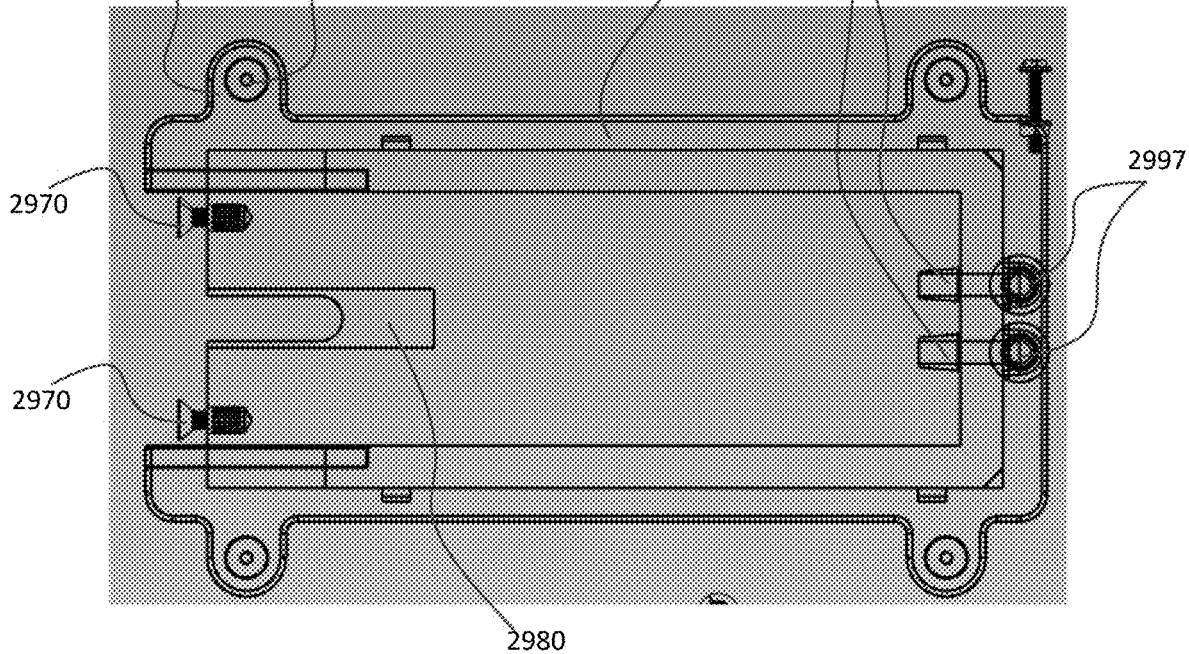
FIG. 32B illustrates another top view of the exemplary implementation of an insert receiving chamber of FIG. 32A.

FIG. 32B illustrates another top view line drawing of insert receiving chamber 2910 with removable fluid flow connector section 2965 removed. Screws 2970 are inserted in insert receiver chamber 2910 without removable fluid flow connector section 2965.

Figure 33:
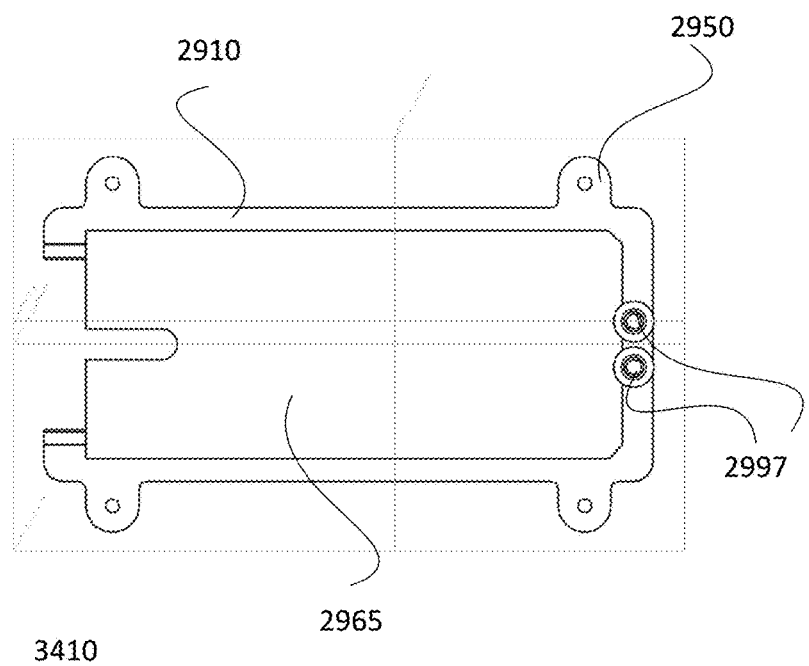
FIG. 33 illustrates yet another view of the exemplary implementation of an insert receiving chamber of FIG. 32A.

FIG. 33 illustrates a bottom view line drawing of insert receiving chamber 2910 with removable fluid flow connector section 2965 removed. First section 2960 includes four screw connections 2950 shown here without screws 2955. Conduit connectors 2997 are shown.

Figure 34A:
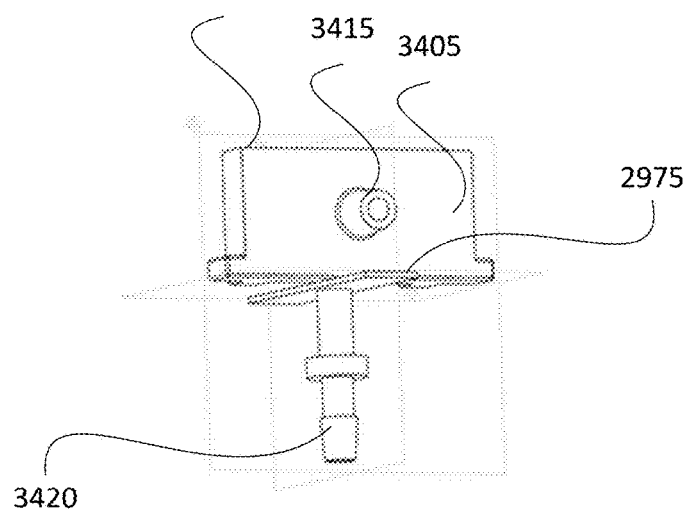
FIG. 34A illustrates an isometric view of an exemplary implementation of a removable fluid flow connector section.
Figure 34B:
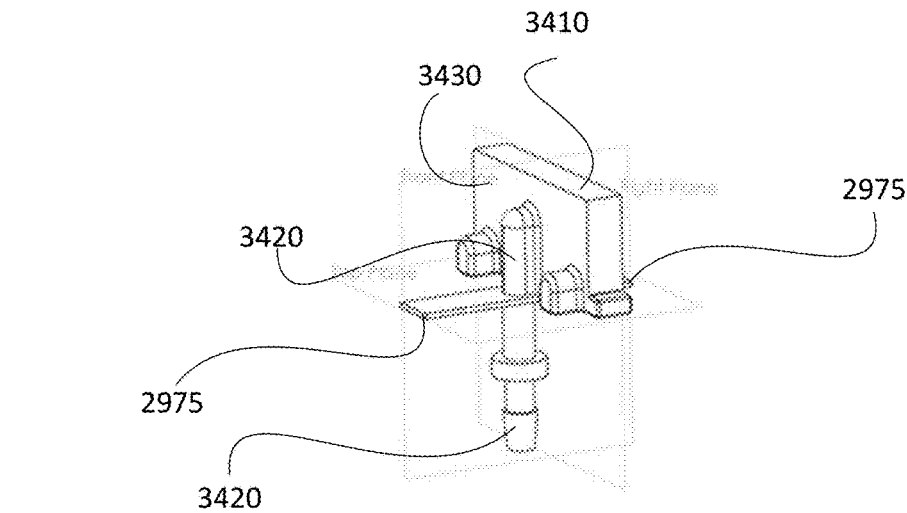
FIG. 34B illustrates another view of the exemplary removable fluid flow connector section of FIG. 34A.

FIGS. 34A and 34B illustrate two different isometric views of removable fluid flow connector section 2965. FIG. 34A shows a perspective of an inside surface 3405 of wall 3410 of section 2965 and a fluid flow connector 3415. A conduit connector 3420 for connecting to an internal connection and/or connective tubing of system 2900 is shown with tongue 2975 extending to both sides of wall 3410. FIG. 34B shows a perspective of an outside surface 3430 of wall 3410 showing conduit 3435 connecting fluid flow connector 3415 to conduit connector 3420 to allow fluid flow between fluid flow connector 3415 and conduit connector 3420.

Figure 35A:
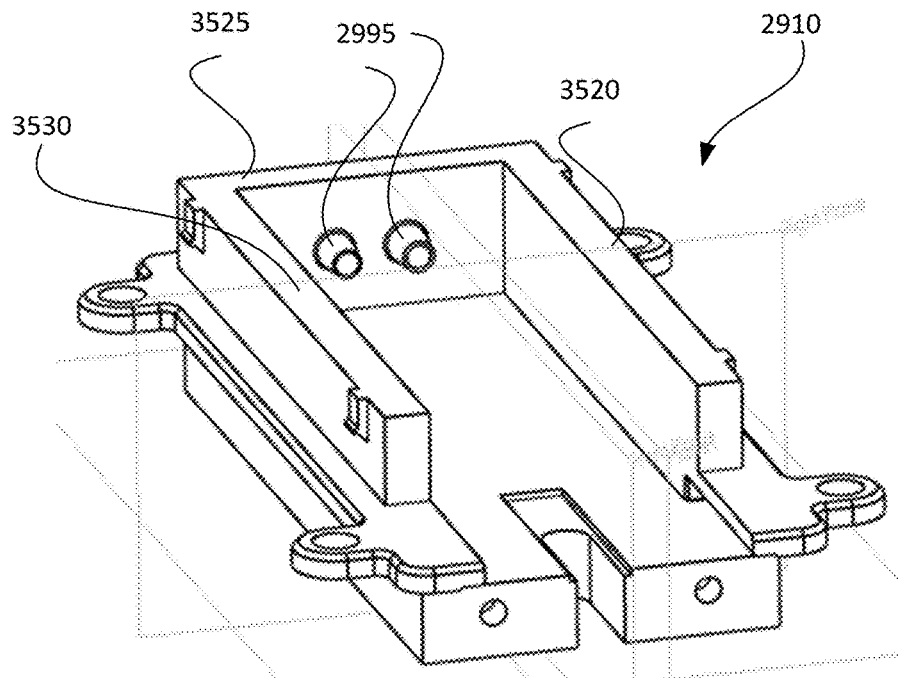
FIG. 35A illustrates still another view of the exemplary insert receiving chamber of FIG. 32A.
Figure 35B:
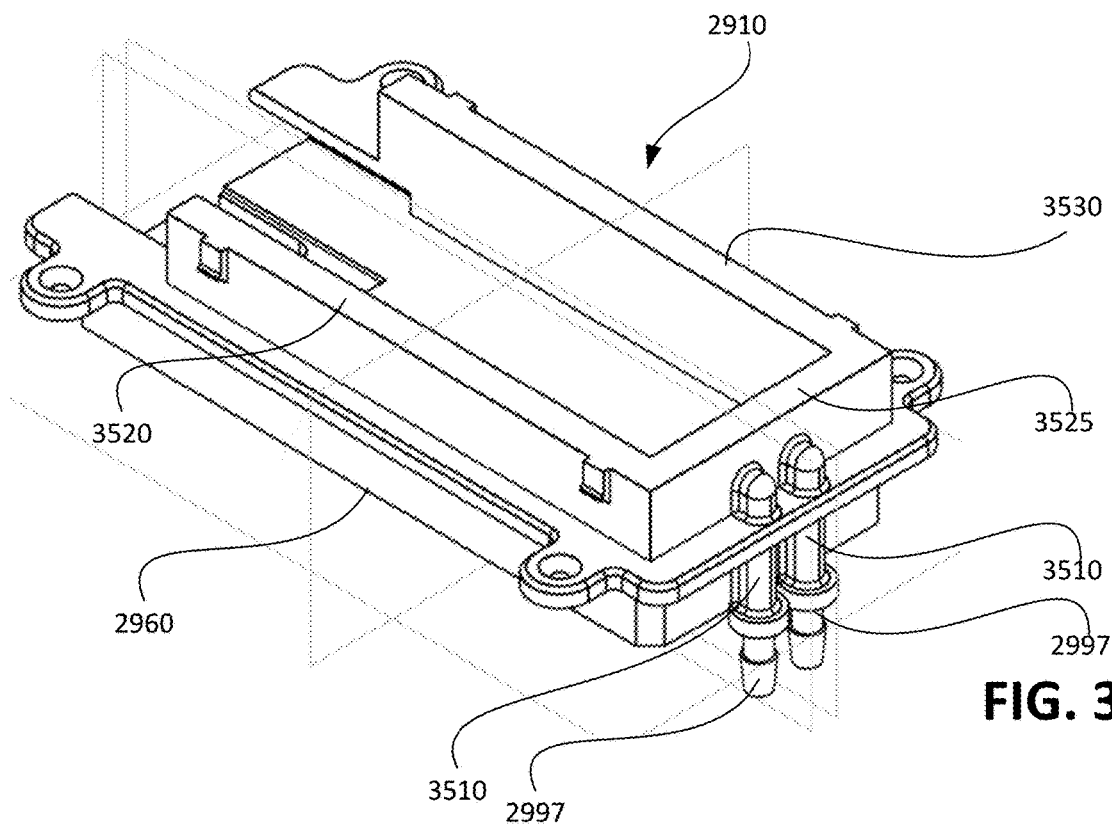
FIG. 35B illustrates still yet another view of the exemplary insert receiving chamber of FIG. 32A.

FIGS. 35A and 35B illustrate two different isometric views of insert receiving chamber 2910 with removable fluid flow connector section 2965 removed. Insert receiving chamber 2910 includes two conduit connectors 2997 each connected to a corresponding one of fluid flow connectors 2995 via a conduit 3510 that allows fluid to flow between each of the conduit connectors 2997 and the corresponding one to fluid flow connectors 2995. Insert receiving chamber 2910 section 2960 includes three side walls 3520, 3525, and 3530.

Figure 36A:
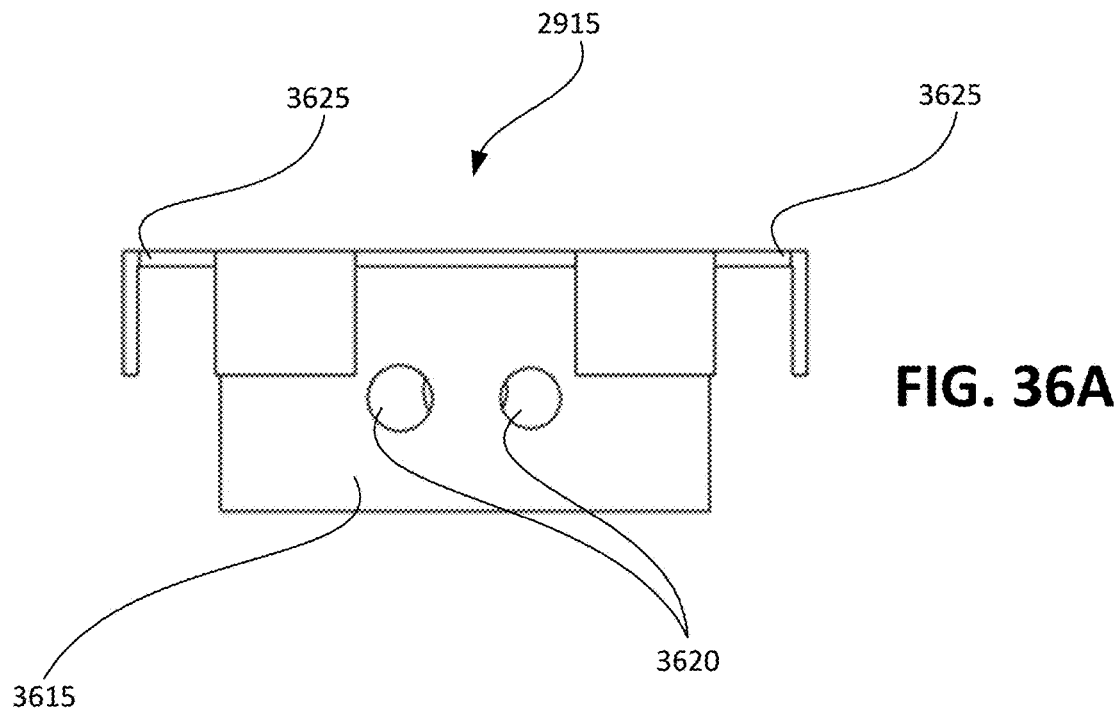
FIG. 36A illustrates an exemplary implementation of a modular insert.
Figure 36B:
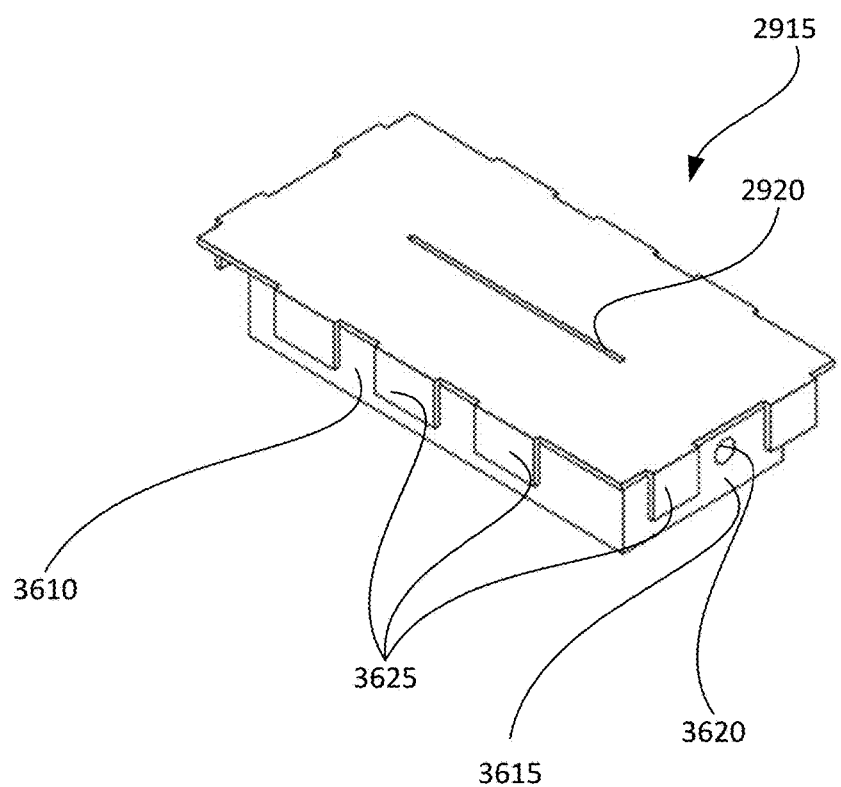
FIG. 36B illustrates another view of the exemplary modular insert of FIG. 36A.

FIGS. 36A and 36B illustrate two different external views of modular insert 2915 showing a top simulated skin cover with a slot 2920. Modular insert 2915 includes outside surfaces 3610 of walls 3615 that enclose one or more simulated anatomical components. FIG. 36A shows two holes 3620 in walls 3615 configured for connection to fluid flow connectors 2995. The walls of a modular insert may be constructed of any of a variety of materials. Example materials for the walls of a modular insert include, but are not limited to, a plastic, a synthetic polymer, a polyurethane, a rubber, a silicone, and any combinations thereof. In one example, one or more walls of a modular insert, such as modular insert 2915, include a synthetic polymer. In another example, one or more walls of a modular insert, such as modular insert 2915, include a silicone. In yet another example, one or more walls of a modular insert, such as modular insert 2915, include a polyurethane. Holes 3620 are configured, dimensioned, sized, and positioned to connect with corresponding fluid flow connectors 2995. Modular insert 2915 includes wings 3630. Wings 3625 are configured to seat on top of walls 3410, 3520, 3525, and 3530. Other mechanisms for fitting a modular insert to one or more walls of an insert receiving chamber are contemplated and should be understood from the current disclosure.

It is contemplated that a modular insert may include one or more fluid flow connectors as described herein that are connected to one or more holes in a wall of the modular insert (e.g., holes 3620 of modular insert 2915) such that the one or more fluid flow connectors is facing outward and each configured to mate to a corresponding one of a fluid flow connector of a surgical simulation device as described herein. A modular insert may also have one or more fluid flow connectors connected to one or more holes in a wall of the modular insert, such fluid flow connector facing inward to the interior volume of the modular insert and configured to mate to a corresponding one of a fluid flow connector of a terminal end of a simulated anatomical component. It is contemplated that a hole in a wall of a modular insert may include both an inward facing and an outward facing fluid flow connector. It is further contemplated that a hole in a wall of a modular insert may include a fluid flow tubing or conduit to aid in the flow of simulated bodily fluid.

FIGS. 37A and 37B illustrate two different views of chamber clamp 2925 showing a frame 3710 with a top surface 3715, side outside surfaces 3720, a bottom surface 3725, and inside side surfaces 3730. A void 3735 is shown. In one exemplary aspect, a chamber clamp holds a modular insert, such as modular insert 2915, in tension in place so that a user of a surgical simulation system may make incisions in a simulated skin cover. In another exemplary aspect, a chamber clamp may assist in securing a modular insert in an insert receiving chamber. In practice, bottom surface 3725 comes into contact with a top surface of modular insert 2915 and inside side surfaces 3730 secure wings 3625 over walls 3410, 3520, 3525, and 3530.

Figure 38:
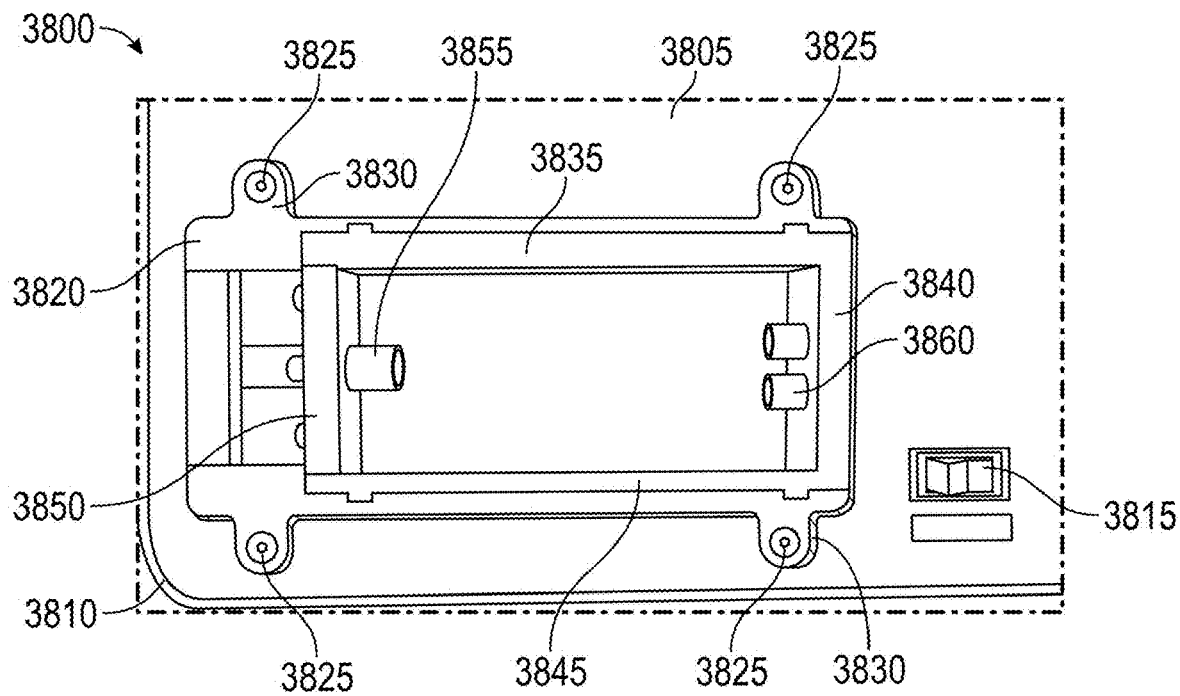
FIG. 38 illustrates a partial top view of yet another exemplary implementation of a surgical simulation system.

FIGS. 38 to 42B illustrate another embodiment of a surgical simulation system 3800 similar to system 2900 and having similar features, components, and characteristics. FIG. 38 shows a top view of a portion of a top surface 3805 of an enclosure 3810 of the surgical simulation system 3800. System 3800 includes an on/off switch 3815 in the lower left corner. On/off switch 3815 is connected to electronics and wiring internal to enclosure 3810 for operating the system. An insert receiving chamber 3820 is shown extending up from top surface 3805 and attached by four screws 3825 through screw connectors 3830 of insert receiving chamber 3820. The insert receiving chamber has four walls 3835, 3840, 3845, 3850 that extend upward from top surface 3805. A single fluid flow connector 3855 extends from an inner surface of wall 3850 on the left. Fluid flow connector 3855 is positioned centrally on wall. Wall 3850 is designed to slide left/right to change the dimensions of the inner cavity of the insert receiving chamber (e.g., to accept different sized modular inserts). Wall 3840 is shown with two fluid flow connectors 3860 extending from an inner surface of wall 3840. These three fluid flow connectors 3855, 3860 are connected via conduit to conduit connectors (not shown) internal to the enclosure and to fluid flow components (e.g., a pump, a fluid reservoir) inside to provide a flow of simulated bodily fluid that can be passed via fluid flow connectors through a simulated anatomical component of a modular insert that can be connected as described herein.

Figure 39:
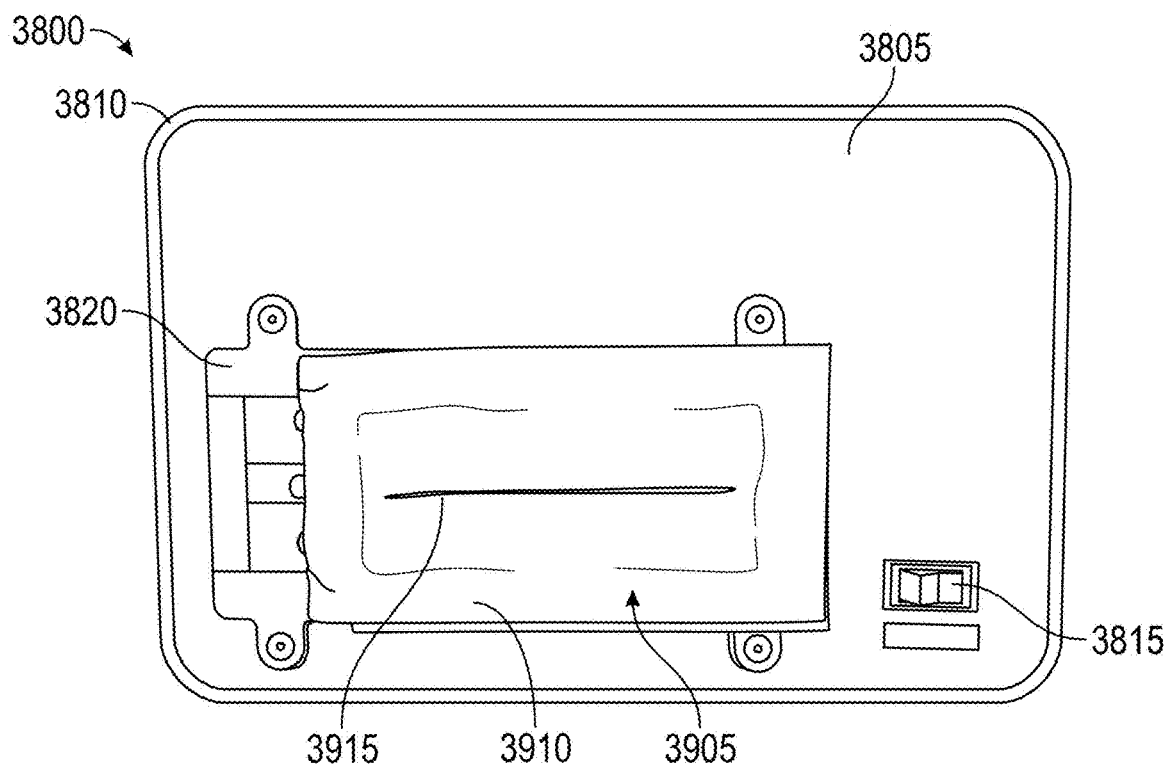
FIG. 39 illustrates another top view of the exemplary surgical simulation system of FIG. 38.

FIG. 39 shows another exemplary top view of the 3800 with a modular insert 3905 placed in insert receiving chamber 3820 (e.g., conformally fit such that the housing of modular insert 3905 is sized similarly to the adjusted size of the opening of insert receiving chamber formed by walls 3835, 3840, 3845, 3850). Modular insert 3905 has a simulated skin cover 3910 with a slit 3915 to allow opening for exposing inner components of modular insert 3905 (e.g., simulated vessels and other simulated components). The top surface of modular insert 3905 extends beyond the walls of modular insert 3905 to allow overlap of the top surfaces of the walls 3835, 3840, 3845, 3850 shown in FIG. 38. This overlap acts similarly to wings 3635 shown in FIGS. 36A and 36B to assist in securing the modular insert.

Figure 40:
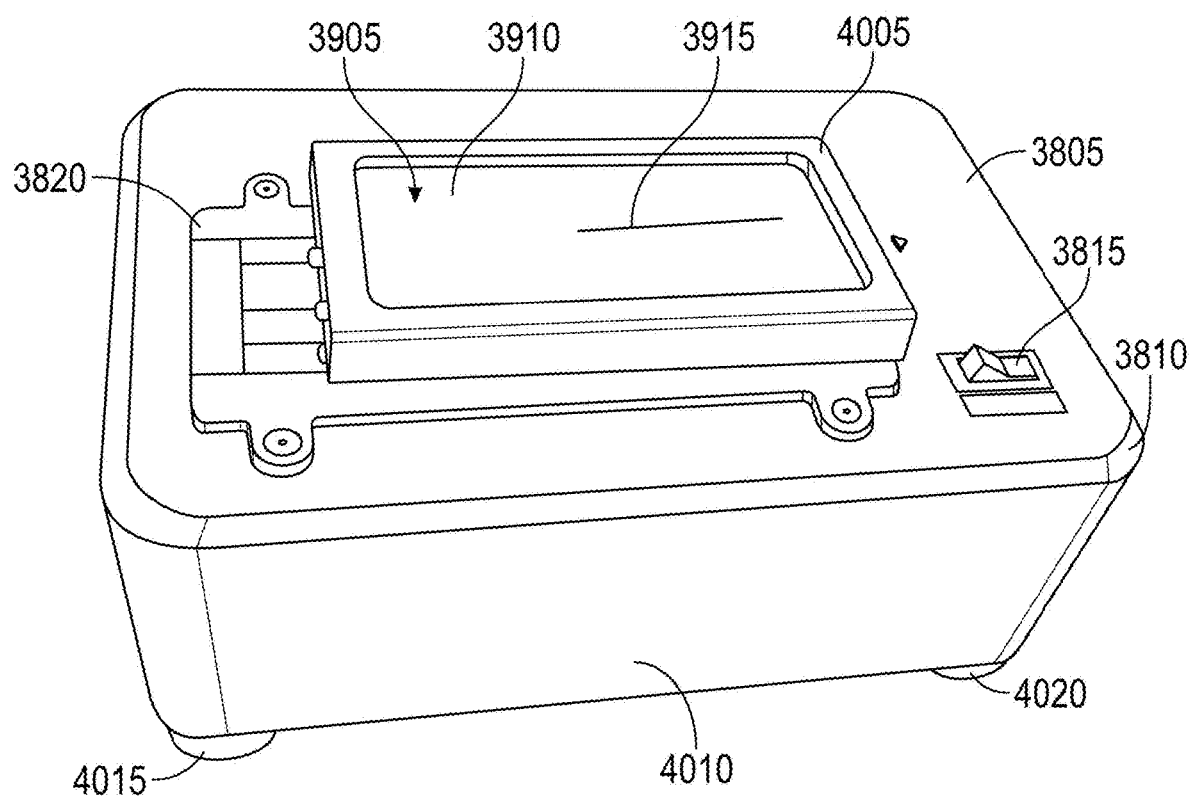
FIG. 40 illustrates an isometric view of the exemplary surgical simulation system of FIG. 38.
Figure 41:
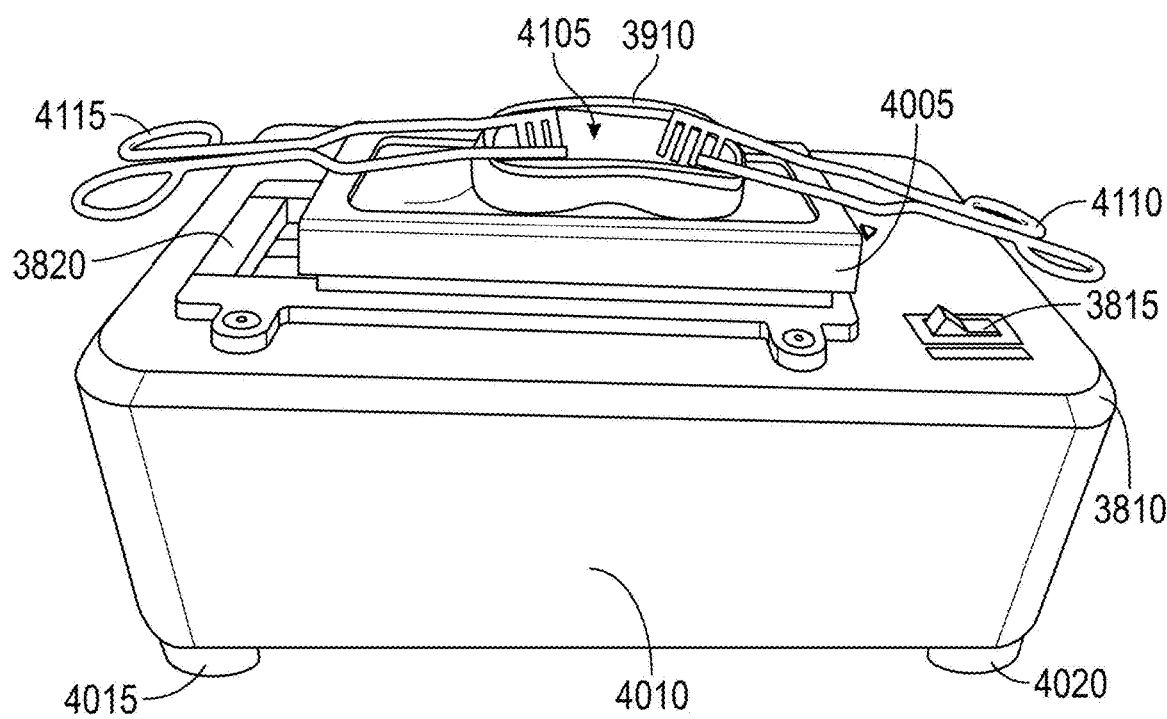
FIG. 41 illustrates another isometric view of the exemplary surgical simulation system of FIG. 38.
Figure 42A:
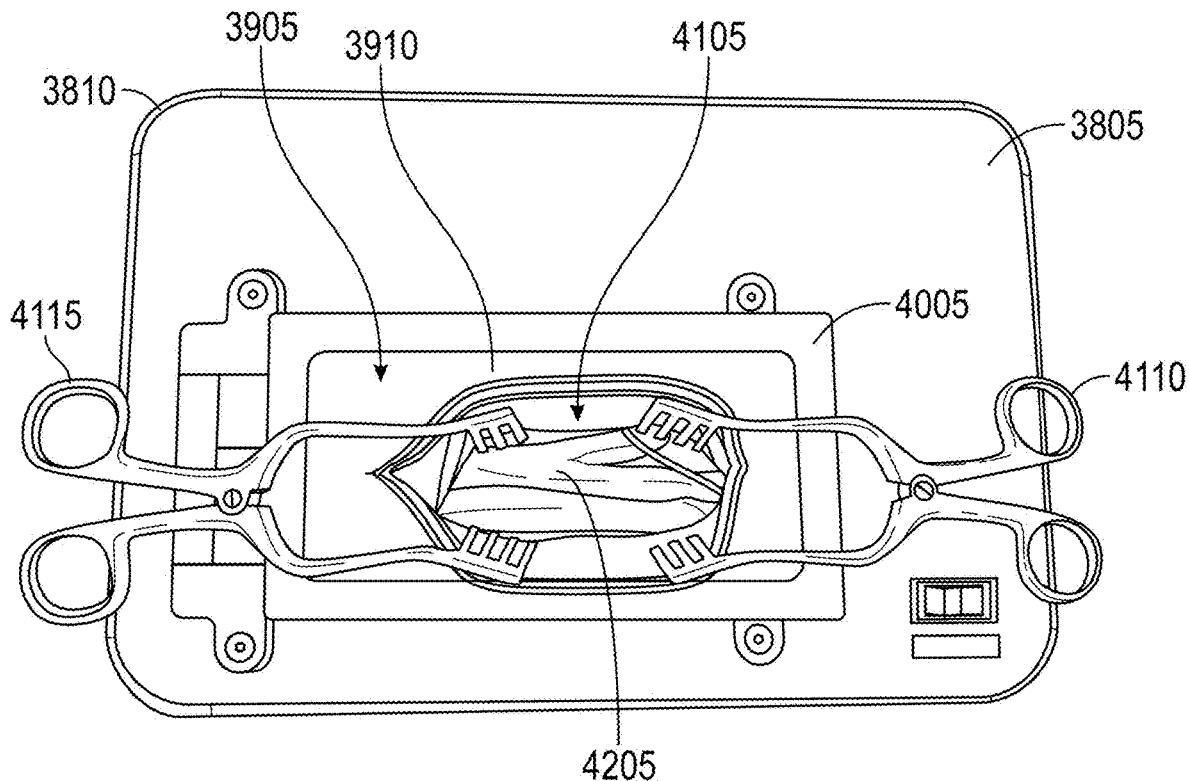
FIG. 42A illustrates yet another top view of the exemplary surgical simulation system of FIG. 38 with simulated skin opened to reveal internal components.
Figure 42B:
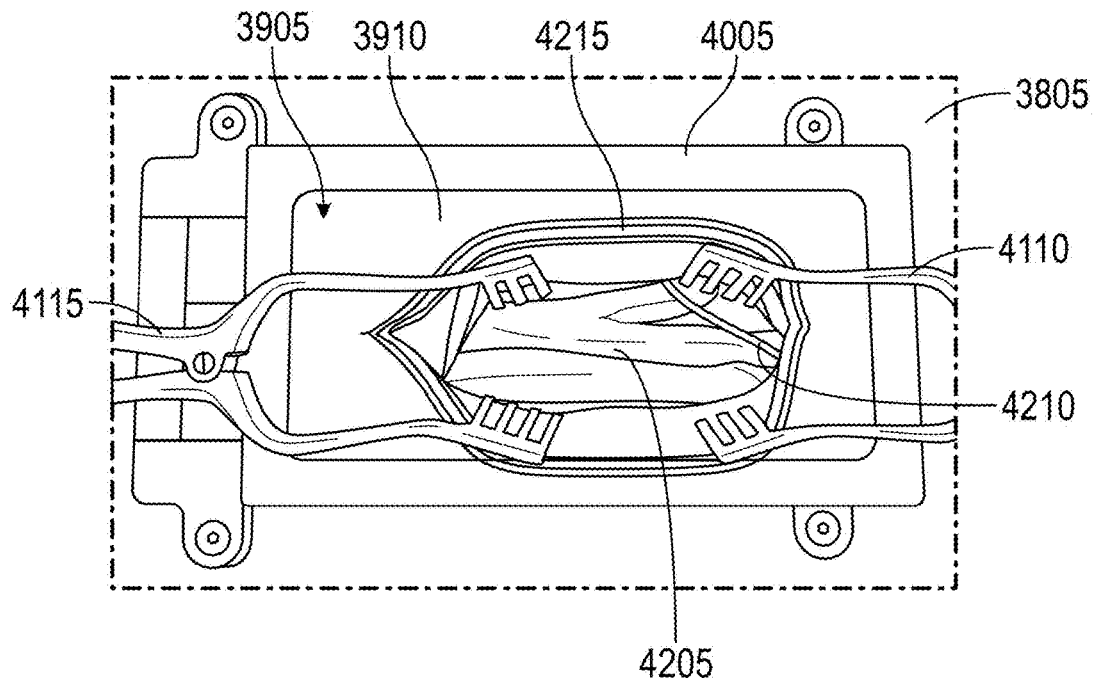
FIG. 42B illustrates a partial view of the opened simulated skin of a modular insert connected to the exemplary surgical simulation system of FIG. 38.

FIG. 40 illustrates the system of FIGS. 38 and 39 with a chamber clamp (black frame) covering the outer portions (including the overlap discussed above) of the top surface of the modular insert and securing the modular insert and providing tension to the simulated skin cover. FIG. 41 illustrates a side view of the system of FIGS. 38 to 40. In FIG. 41, the simulated skin of the modular insert is shown held open by two skin retractor medical procedure devices. FIG. 42A illustrates a top down view of the system of FIGS. 38 to 41 showing the opened modular insert (held open by a skin retractor on each of the left and right sides. The inside of the modular insert is shown with a bifurcated simulated anatomical component in the form of a bifurcated vascular vessel (light colored internal component). Other simulated anatomical components are shown, including layers of tissue and other vessels. Fluid from a pump/reservoir fluid components inside the enclosure of the system is allowed to flow via connective tubing to conduit connectors, conduit, and the fluid flow connectors of the insert receiving chamber through the vascular vessel of the modular insert. This fluid flow provides a realistic experience for simulated surgical procedures performed using the system.

Figure 43:
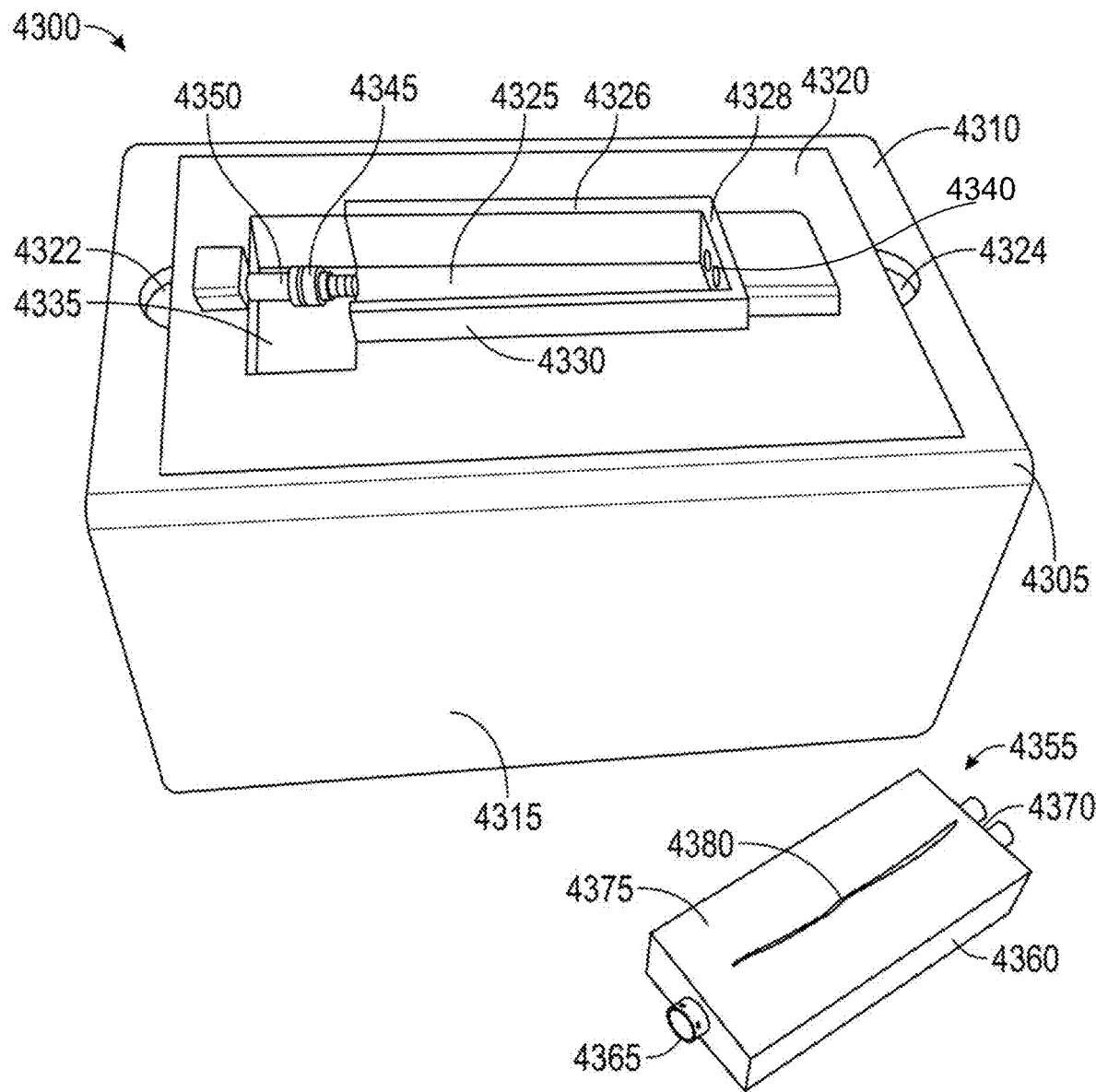
FIG. 43 illustrates an isometric view of still another exemplary implementation of a surgical simulation system.

FIG. 43 illustrates another exemplary embodiment of a surgical simulation system 4300. System 4300 includes a surgical simulation device having a device enclosure 4305 having a top surface 4310, a side surface 4315, and a liftable portion 4320 in the top surface 4310. The surgical simulation device also includes the internal support components shown in FIG. 45. Liftable portion 4320 is configured to be lifted upward from top surface 4310 (e.g., in a fashion of a door with one or more hinges connected to one side of liftable portion 4320 and enclosure 4305, as an unattached insert that can be completely separated from top surface 4310, etc.) allow a user to open enclosure 4305 for access to internal components of system 4300. Top surface 4310 includes indents 4322, 4324 for providing grip of liftable portion 4320 by a user. System 4300 includes an insert receiving chamber 4325 having three side walls 4326, 4328, 4330 formed in a rectangular shape for receiving a similarly configured modular insert, such as those disclosed herein. At an end opposite wall 4328 there is shown an opening in insert receiving chamber 4325 and a fluid spill capture reservoir 4335 formed in liftable portion 4320. Fluid spill capture reservoir 4335 may provide a catch for simulated liquid that may spill from fluid flow connector 4645 (e.g., during connection to a fluid flow connector of a modular insert). Two fluid flow connectors 4340 are shown connected through wall 4328 to conduit connectors and fluid conduit internal to enclosure 4305 to allow connection of fluid flow connectors of a modular insert and the flow of simulated bodily fluid that can be passed via fluid flow connectors through a simulated anatomical component of a modular insert that can be connected as described herein. A fluid flow connector 4345 is included connected to fluidic tubing 4350 that connects to internal fluidic flow tubing inside enclosure 4305 and internal fluid flow components (e.g., pump, fluid reservoir). In one example, fluidic tubing 4350 is flexible to provide movement of fluid flow connector 4345 during connection to corresponding connectors of a modular insert. In one example, fluid flow connector 4345 includes a Luer lock connector.

FIG. 43 also illustrates a modular insert 4355 of system 4300 having an exterior housing 4360 and one or more internal simulated anatomical components (not shown), such as the simulated anatomical components disclosed herein. Modular insert 4355 includes a fluid flow connector 4365 configured to connect to fluid flow connector 4345 of system 4300 and fluid flow connectors 4370 configured to connect to fluid flow connectors 4340 of system 4300. Fluid flow connectors 4365, 4370 are connected to one or more simulated anatomical components within modular insert 4355 for allowing simulated bodily fluid to pass from fluidic flow tubing within enclosure 4305 via one or more fluid flow connectors 4340, 4345 through corresponding fluid flow connectors 4365, 4370 and through the one or more simulated anatomical components within modular insert 4355 to simulate the natural flow of such bodily fluid during one or more simulated surgical procedures. Modular insert 4355 includes a simulated skin cover 4375 non-removably attached to housing 4360. Simulated skin cover 4375 is shown with a slit 4380 cut into the simulated skin. Modular inserts, such as modular insert 4355, may be provided with or without one or more pre-cut slits, such as shown here in FIG. 43. The shape, size, positioning of fluid flow connectors 4365, 4370, and other configuration of modular insert 4355 is such that modular insert 4355 fits within insert receiving chamber 4325 and proper connections can be made of fluid flow connectors 4365, 4370 with corresponding ones of fluid flow connectors 4340, 4345.

Figure 44:
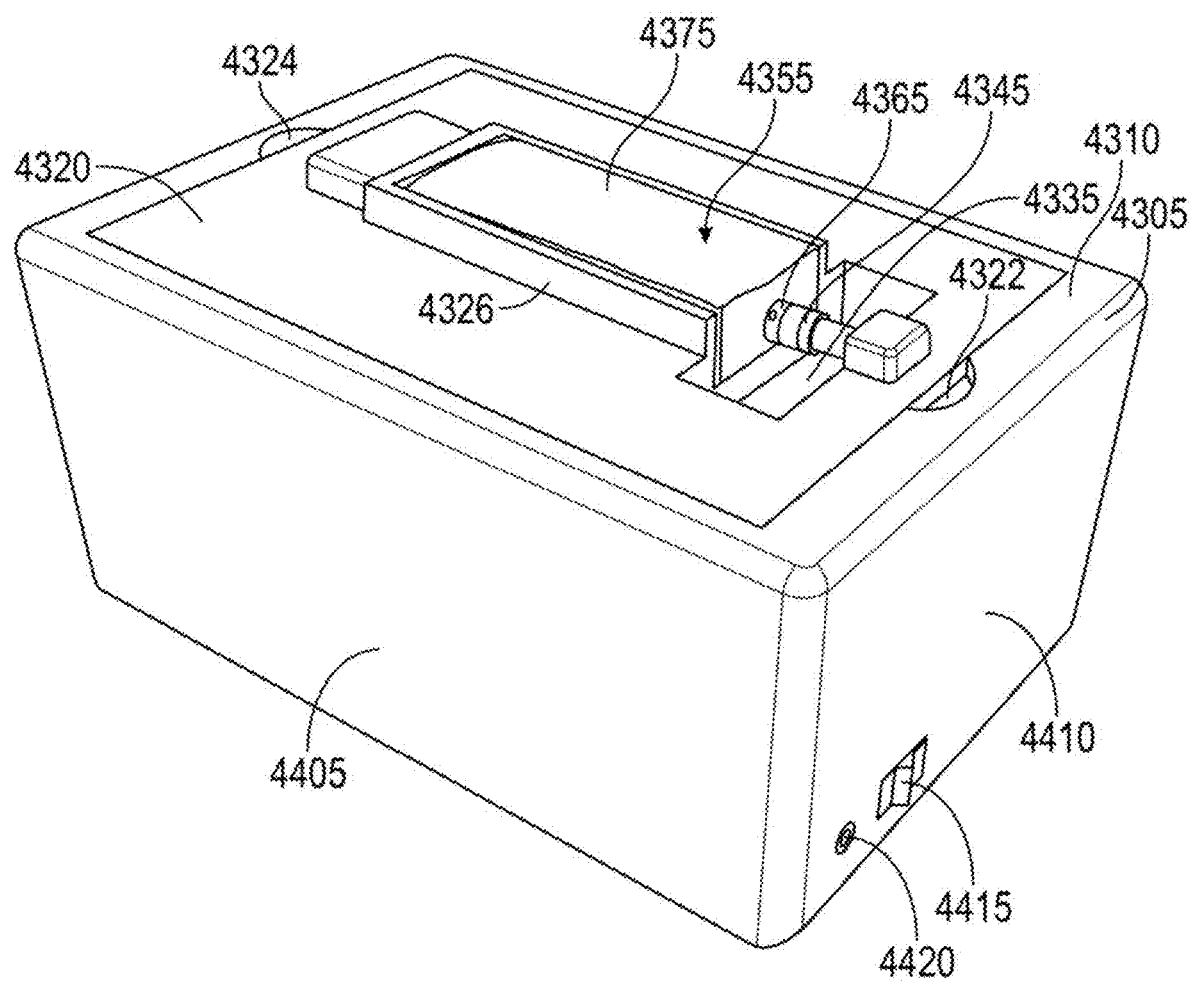
FIG. 44 illustrates another isometric view of the exemplary surgical simulation system of FIG. 43 having a modular insert connected thereto.

FIG. 44 illustrates another view of system 4300 showing a side surface 4405 of enclosure 4305 that is opposite side surface 4315, and another side surface 4410 having a power on/off switch 4415 and a power input connector 4420. Modular insert 4355 is shown inserted within insert receiving chamber 4325 with fluid flow connector 4365 connected to fluid flow connector 4345.

Figure 45:
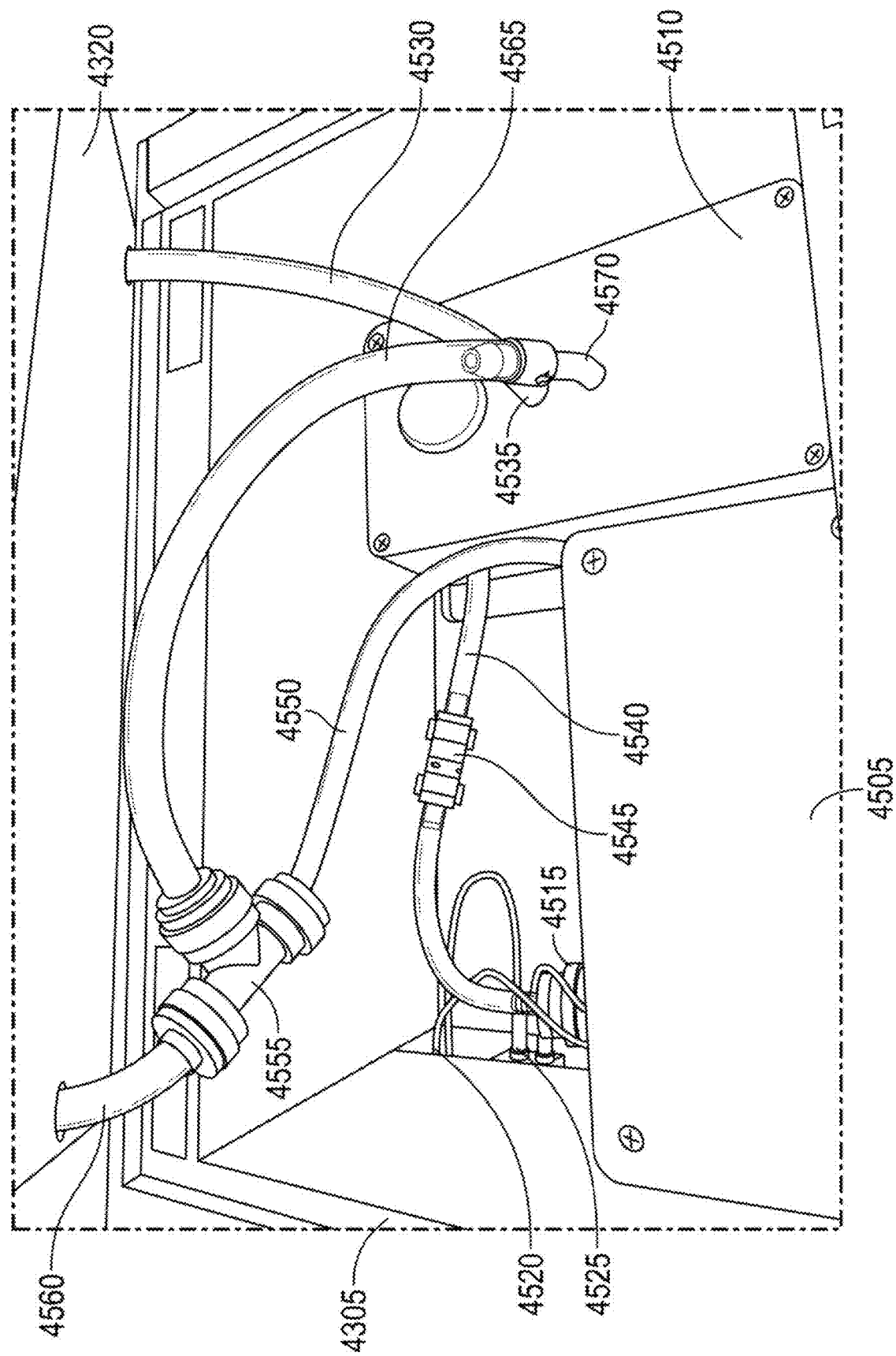
FIG. 45 illustrates an internal component view of the exemplary surgical simulation system of FIG. 43.

FIG. 45 illustrates an internal view of enclosure 4305 of system 4300 with liftable portion 4320 opened to reveal internal components. The internal components include an electronics control circuitry casing 4505, a simulated fluid reservoir 4510, a fluid pump 4515, power supply wiring 4520, and power switch wiring 4525. Electronics control circuitry casing 4505 includes circuitry (e.g., a power supply circuitry for converting supplied power to a power useful for control circuitry, a control circuitry such as a processor and stored instructions for operating the processor, circuitry for controlling pump 4515). Simulated fluid reservoir 4510 is connected to fluid flow tubing 4530 via a fluid flow connector 4535. Fluid flow tubing 4530 connects through liftable portion 4535 to fluid flow connectors 4340 (shown in FIG. 43). Simulated fluid reservoir 4510 is also connected to fluid flow tubing 4540 (which includes a separable fluid flow connector 4545) to pump 4515. Pump 4515 is connected to fluid flow tubing 4550 (via a fluid flow connector not shown, but positioned behind casing 4505), which further connects via fluid flow connector 4555 to fluid flow tubing 4560, which connects through liftable portion 4320 to fluid flow connector 4345 (shown in FIGS. 43, 44). A bypass fluid flow tubing 4565 connects fluid flow connector 4555 to simulated fluid reservoir 4510 via a fluid flow connector 4570. In one exemplary aspect, a bypass fluid flow tubing, such as tubing 4565, in any of the systems of the current disclosure allows an alternate flow path to manage fluid flow when fluid flow through the system and/or an attached simulated anatomical component is regulated and/or stopped (e.g., via a disconnection of self-sealing fluid flow connectors, via clamping of a portion of an simulated anatomical component, etc.).

In one exemplary usage of system 4300, a user connects a power supply to power input connector 4420. Electrical power is provided to the circuitry of control circuitry casing 4505 via power supply wiring 4520. Fluid flow connectors 4370 of modular insert 4355 are connected with fluid flow connectors 4340 of the surgical simulation device enclosure 4305 and fluid flow connector 4365 of modular insert 4355 is connected with fluid flow connector 4345 of enclosure 4305 while inserting modular insert 4355 into insert receiving chamber 4325. In the example of modular insert 4355, simulated skin cover 4375 does not overhang the walls of housing 4360 or walls 4326, 4328, or 4330 when inserted. In one such example, the size and material selection of the walls of a modular insert can be such that the modular insert fits snugly within the corresponding insert receiving chamber (e.g., due to friction between the walls of the modular insert and the insert receiving chamber and/or tension from the connection of fluid flow connectors). Referring again to the exemplary usage of system 4300, once modular insert 4355 is connected to corresponding fluid flow connectors 4435 and inserted into insert receiving chamber 4325, a user may turn on the device using power switch 4415, which is connected to the control circuitry of control circuitry casing 4505 via power switch wiring 4525. In one such example, when power switch 4415 is turned on the control circuitry operates pump 4515 to cause fluid from reservoir 4510 to flow through the various fluid flow tubings into the one or more simulated anatomical components within modular insert 4355. One or more simulated surgical tasks may be performed on the one or more simulated anatomical components. A user may perform simulated surgical tasks on a simulated anatomical component of a system of the current disclosure with or without simulated fluid flowing through the simulated anatomical component. Additionally, a user may perform a surgical task on a simulated anatomical component without fluid being present inside the corresponding portion of the simulated anatomical component. A user may also utilize one or more clamps (e.g., applied to one or more sections of a simulated anatomical component) to regulate flow of a simulated fluid in such a system with or without pumping power being asserted on such fluid.

Figure 46:
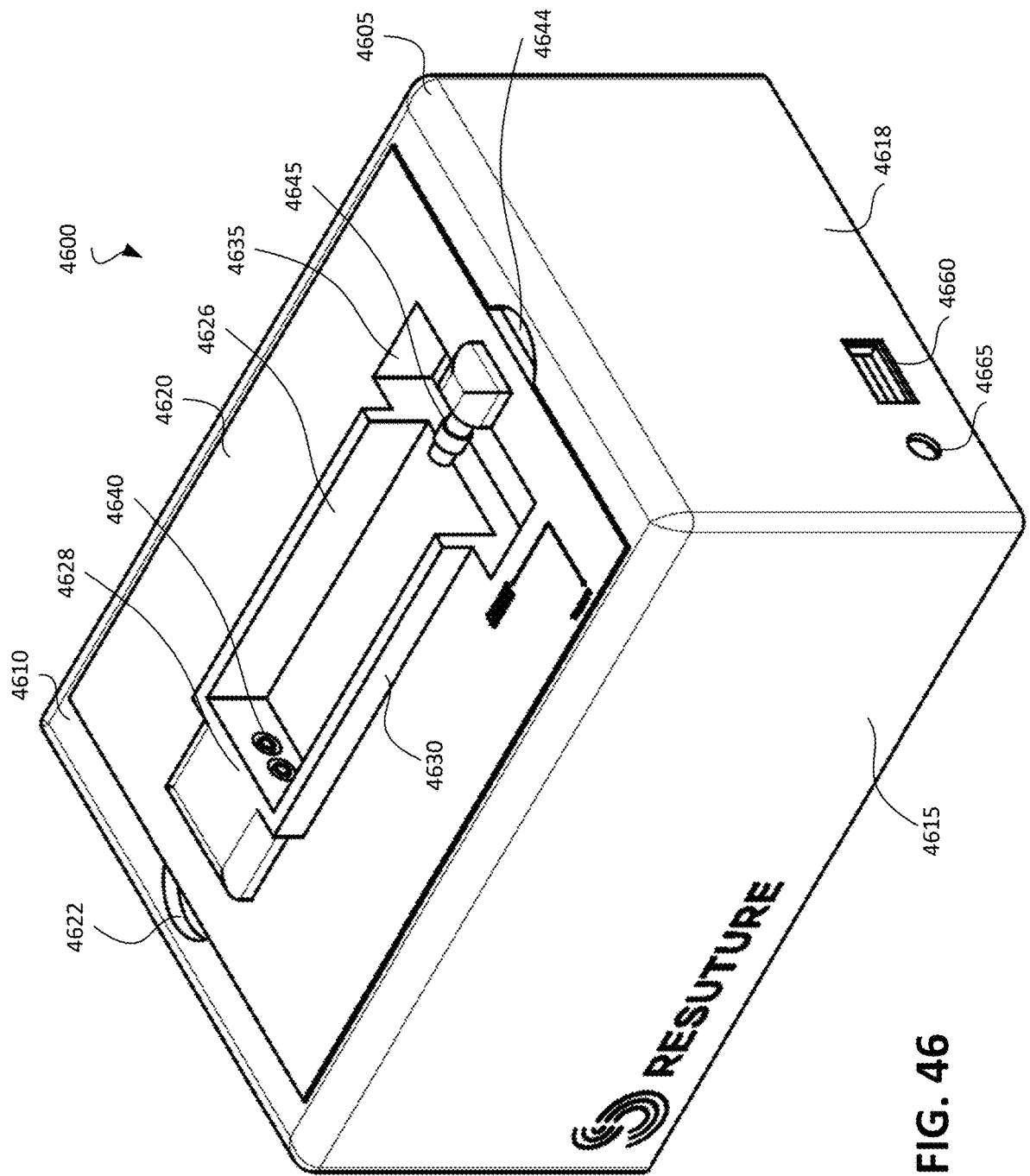
FIG. 46 illustrates an isometric view of yet another exemplary implementation of a surgical simulation system.
Figure 47:
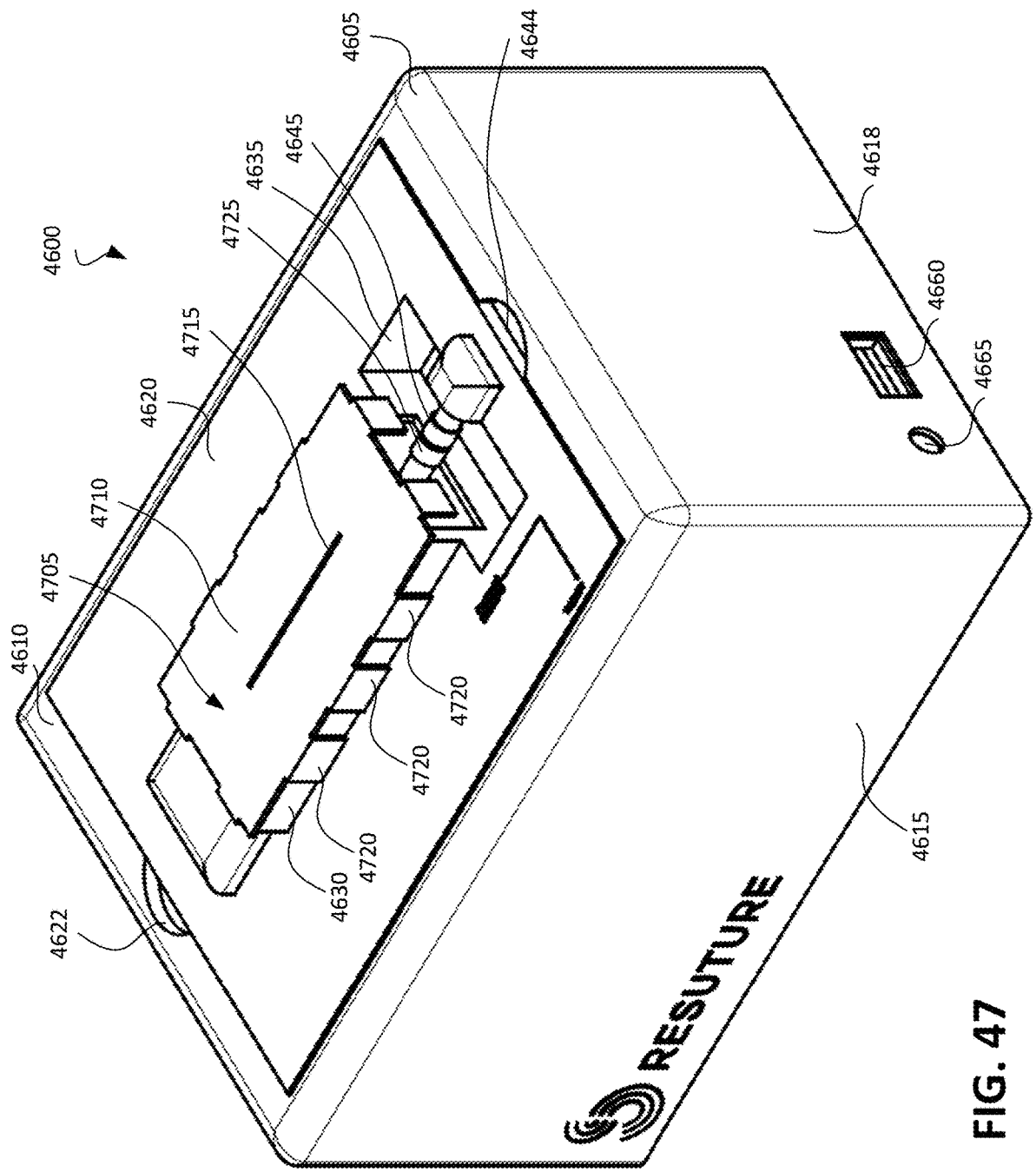
FIG. 47 illustrates another view of the exemplary surgical simulation system of FIG. 46 having a modular insert connected thereto.

FIGS. 46 and 47 illustrate yet another example of a surgical simulation system 4600. System 4600 includes a surgical simulation device having a device enclosure 4605 having a top surface 4610, a side surface 4615, another side surface 4618 and a liftable portion 4620 in the top surface 4610. Liftable portion 4620 is configured to be lifted upward from top surface 4610 (e.g., in a fashion of a door with one or more hinges connected to one side of liftable portion 4620 and enclosure 4605, as an unattached insert that can be completely separated from top surface 4610, etc.) allow a user to open enclosure 4605 for access to internal components of system 4600. Top surface 4610 includes indents 4622, 4624 for providing grip of liftable portion 4620 by a user. FIG. 46 shows a view of system 4600 illustrating an insert receiving chamber 4625 having three side walls 4626, 4628, 4630 formed in a rectangular shape for receiving a similarly configured modular insert, such as those disclosed herein. At an end opposite wall 4628 there is shown an opening in insert receiving chamber 4625 and a fluid spill capture reservoir 4635 formed in liftable portion 4620. Fluid spill capture reservoir 4635 may provide a catch for simulated liquid that may spill from fluid flow connector 4645 (e.g., during connection to a fluid flow connector of a modular insert). Two fluid flow connectors 4640 are shown connected through wall 4628 to conduit connectors and fluid conduit internal to enclosure 4605 to allow connection of fluid flow connectors of a modular insert and the flow of simulated bodily fluid that can be passed via fluid flow connectors through a simulated anatomical component of a modular insert that can be connected as described herein. A fluid flow connector 4645 is included connected to fluidic tubing 4650 that connects to internal fluidic flow tubing inside enclosure 4605 and internal fluid flow components (e.g., pump, fluid reservoir). In one example, fluidic tubing 4650 is flexible to provide movement of fluid flow connector 4645 during connection to corresponding connectors of a modular insert.

FIG. 47 illustrates another view of system 4600 in which a modular insert 4705 is inserted within insert receiving chamber 4625. Modular insert 4705 includes a simulated skin cover 4710 having a pre-cut slit 4715 and one or more simulated anatomical components (not shown) inside modular insert 4705, which are revealable through simulated skin cover 4710 during simulated surgical tasks. Simulated skin cover 4710 and/or other components of modular insert 4705 are designed to overhang the walls of the housing of modular insert 4705 such that the overhang is configured to seat upon the top surfaces of walls 4626, 4628, 4630 and fluid flow connectors. The overhang includes multiple wings 4720 designed and configured to wrap downward over the outside surfaces of walls 4626, 4628, 4630. Modular insert 4705 includes a fluid flow connector 4725 configured to mate with fluid flow connector 4625. Modular insert 4705 also includes additional fluid flow connectors (not shown) that are configured to connect to fluid flow connector 4640. In FIG. 47, modular insert 4705 is shown with its fluid flow connectors connected to fluid flow connectors 4640 (not visible) and 4645 (visible). During operation, system 4600 may operate with one or more of the features and actions as described herein with respect to the other surgical simulation systems disclosed.

In one exemplary aspect, a simulated anatomical component and/or a surgical simulation system of the current disclosure may include diseased conditions (i.e., plaque, aneurysm) while maintaining the geometry and mechanical properties of the synthetic vascular material. Moreover, examples of simulated vascular components and systems of the current disclosure incorporate the breadth and anatomically variability of human circulatory systems to fully prepare surgeons for clinical scenarios. In another exemplary aspect, a simulated anatomical component and/or surgical simulation system of the current disclosure may provide flexibility to create varying morphologies and replicate diseased conditions while maintaining the physical properties of in vivo tissue.

In general, the systems, methods, etc. of the present invention have been exemplified by various exemplary embodiments and implementations as shown in the accompanying drawings and as described above. However, it should be understood that the presentation of these embodiments and implementations should not be construed as requiring that: 1) these embodiments and implementations stand in isolation from one another; 2) that individual components, features, aspects, and/or functionalities described relative to each one of the embodiments and implementations cannot be used independently of the corresponding embodiment or implementation; and 3) that individual components, features, aspects, and/or functionalities described cannot be used individually in connection with other embodiments and implementations, either described herein or derivable therefrom, alone and/or in any combination with one another. On the contrary, those skilled in the art will appreciate that the individual components, features, aspects, and functionalities of a particular embodiment or implementation can, as appropriate under the circumstances, be utilized alone and in any subcombination with other components, features, aspects, and/or functionalities of that particular embodiment or implementation and with any other embodiment or implementation, including the specific examples described herein.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of producing a simulated vascular vessel, the method comprising:
forming a vascular vessel mold from a soluble polymer, the vascular vessel mold defining an interior void of a vascular vessel for a surgical simulation system;
applying one or more layers of elastomer around the vascular vessel mold to form the simulated vascular vessel;
allowing the one or more layers of elastomer to cure to form a wall of the simulated vascular vessel; and
at least partially dissolving the vascular vessel mold to create a passage for liquid in the simulated vascular vessel, wherein at least a portion of the soluble polymer remains in the passage as a simulated vascular abnormality.

2. A method according to claim 1, wherein the one or more layers of elastomer includes at least two layers of elastomer and the method further comprises: applying a layer of an elastic mesh fabric between a first one and a second one of the at least two layers of elastomer.

3. A method according to claim 1, wherein the elastic mesh fabric includes a material selected from the group consisting of a polyester, a polyether-polyurea composition, and any combinations thereof.

4. A method according to claim 1, wherein the simulated vascular abnormality includes an abnormality selected from the group consisting of a plaque, an embolism, a stenosis, a thrombosis, a calcification, and any combinations thereof.

5. A method according to claim 1, wherein the elastomer includes an elastomer selected from the group consisting of silicone, a polyurethane rubber, and any combinations thereof.

6. A method according to claim 1, wherein the soluble polymer includes a soluble polymer selected from the group consisting of an acrylonitrile butadiene styrene polymer, a polyvinyl alcohol, a high-impact polystyrene, an aliphatic rubbery synthetic polymer, and any combinations thereof.

7. A method according to claim 1, wherein the soluble polymer is a polyvinyl alcohol.

8. A method according to claim 1, wherein the soluble polymer includes an acrylonitrile butadiene styrene polymer.

9. A method according to claim 1, wherein the soluble polymer includes a high-impact polystyrene.

10. A method according to claim 1, wherein the soluble polymer is soluble in a material including a solvent selected from the group consisting of water, alcohol, acetone, terpene, and any combinations thereof.

11. A method according to claim 1, wherein the soluble polymer is alcohol soluble.

12. A method according to claim 1, wherein the soluble polymer is acetone soluble.

13. A method according to claim 1, wherein said forming includes injection molding the vascular vessel mold.

14. A method according to claim 1, wherein said forming includes printing the vascular vessel mold.

15. A method according to claim 1, wherein said forming includes creating a vascular abnormality enlargement in the vascular vessel mold and wherein said at least partially dissolving the vascular vessel mold reveals the wall of the simulated vascular vessel with a retained shape of the vascular abnormality enlargement.

16. A method according to claim 1, wherein the vascular vessel mold forms a vascular bifurcation.

17. A method according to claim 1, wherein the vascular vessel mold includes an outer surface including textured features, the textured features replicating vessel wall features such that when the vascular vessel mold is at least partially dissolved an interior surface of the wall of the simulated vascular vessel includes at least a portion of the vessel wall features.

18. A method according to claim 1, further comprising:
combining the vascular vessel mold with a rod prior to the applying one or more layers of elastomer, wherein the applying one or more layers of elastomer also applies the one or more layers of elastomer around the rod to form the simulated vascular vessel; and
removing the rod after the one or more layers of elastomer have at least partially cured.

19. A method according to claim 17 wherein the rod includes an outer surface including textured features, the textured features replicating vessel wall features such that when the rod is removed an interior surface of the wall of the simulated vascular vessel includes at least a portion of the vessel wall features.

* * * * *